United States Patent Office 3,641,239
Patented Feb. 8, 1972

---

3,641,239
COSMETIC WAX COMPOSITION
Sharon R. Mohrlok, Lansing, Mich., assignor to Dow Corning Corporation, Midland, Mich.
No Drawing. Continuation-in-part of application Ser. No. 443,697, Mar. 29, 1965. This application Nov. 6, 1968, Ser. No. 773,939
Int. Cl. A61k 7/02
U.S. Cl. 424—64    18 Claims

ABSTRACT OF THE DISCLOSURE

A cosmetic composition useful for lipsticks, lip rouge, mascara, styptic crayon and the like comprising cosmetic solvent, coloring agent and wax. The wax is at least 15 percent by weight silicone wax.

---

This is a continuation-in-part of Ser. No. 443,697, filed Mar. 29, 1965, now abandoned.

The present invention relates to an improved cosmetic composition suitable for a lip coloring composition comprising a silicone wax.

Humans have been beautifying themselves down through the ages with a variety of concoctions that have become known as cosmetics. One of the most widely used and accepted cosmetics is the lip coloring composition. This lip coloring composition can come in many forms, the most popular being a lipstick. Lipstick is one of the few indispensable cosmetics in a woman's handbag or on her dresser. The properties of the lipstick are therefore important. In order that a lipstick be acceptable, the composition must come in all the latest shades. Providing various shades can be a problem. In the manufacture of some formulations, the compositions will not accept the coloring agents and readily become streaked, leach-out and/or become completely heterogeneous and will not formulate. The stick must be clean, smooth, have a lustrous surface of the proper color and an attractive odor. The molded product must be free from discoloration, specks, of grit, pinholes or other imperfections. The surface color of the lipstick should be like the color of the film on the lips. The stick must not be dry or brittle nor should oil droplets form on its surface. The lipstick must have a high enough melting point to be sufficiently hard and strong to enable it to be massed into stick form and also to withstand normal use without beraking. However, it must be soft enough to be easily applied to the lips, yet still possessing sufficient body not to "ooze" in a handbag. Application to the lips should be easy and smooth, with little drag and no excess greasiness.

The film on the lips must have a series of desirable subjective qualities along with measurable properties. The film should be tasteless, free from tackiness and have an emollient feel without imparting a sensation of dryness. The color of the film when first applied should be similar in color as it is after wear. The film should not smear or creep into lip folds. The film must be durable enough so that reapplication is not required every 2 or 3 hours. The film, no matter how thin, must to some extent be impervious to mild abrasion such as that encountered during eating and drinking.

From the foregoing description of some of the properties of a lipstick or other lip coloring compositions, it is apparent that formulating such a composition is extremely complex. Indeed lip coloring compositions are complex mixtures of ingredients having a wide variety of properties. Each of the ingredients are intended to impart some desirable property and as a result many materials will provide one desirable property and at the same time introduce an undesirable property and in turn require an addition ingredient to counteract the undesirable property introduced.

An object of the present invention is to provide a cosmetic composition having a high melting point. Another object is to provide a cosmetic composition which is insoluble in water, ethanol and organic fats and oils. Another object is to provide a cosmetic composition which has increased wearability. Another object is to provide a cosmetic composition which is suitable for a lip coloring composition. Another object is to provide a cosmetic composition which can be formulated into a lipstick. Another object is to provide a lipstick which will not bleed, form a bloom on storage, or have color separation. Another object is to provide a cosmetic composition with fewer ingredients. Other objects and advantages will become apparent from the following detailed description.

This invention relates to a cosmetic composition having a wax base comprising cosmetic solvent, coloring agent and organic wax of which at least 15 weight percent is silicone wax selected from the group consisting of (A) an organosilicon block copolymer consisting essentially of (1) 5 to 95 mol percent of blocks of polysiloxanes of the structure

in which the sum of $x+y+z$ has an average value of from 6 to 150, and $y$ and $z$ each have a value of up to 5 mol percent of the sum of $x+y+z$, and (2) 6 to 95 mol percent of blocks of the average unit formula

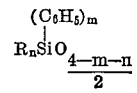

in which R is an alkyl radical containing from 16 to 26 carbon atoms, $m$ has a value of up to 0.25, $n$ has a value of from 0.75 to 1.05 and the sum of $m+n$ has a value of from 0.95 to 1.05, (B) a hydrocarbon-silicone copolymer consisting essentially of a copolymer selected from the group consisting of a copolymer having an average formula

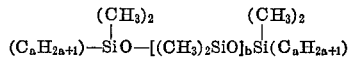

in which $a$ has an average value from 18 to 75 inclusive, $b$ has an average value from 0 to 48 inclusive and there being at least 3 carbon atoms based on the total number of carbon atoms in the $C_aH_{2a+1}$ radicals per silicon atom based on the total number of silicon atoms per molecule, and a copolymer having an average formula

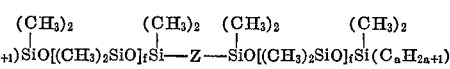

in which $a$ is defines above, $f$ has an average value from 0 to 10 inclusive, and Z is a divalent hydrocarbon radical selected from the group consisting of methylene, ethylene, propylene, butylene, pentylene, hexylene, heptylene, octylene, nonylene and decylene, (C) a silicone-carnauba wax copolymer consisting essentially of a silicon-containing moiety bonded to a carnauba wax moiety through a divalent organic radical (1') having from 2 to 92 carbon atoms and selected from the group consisting of a divalent organic radical which is composed of carbon, hydrogen and oxygen atoms, the latter being in the form of ether, ester or hydroxyl and a divalent organic radical which is composed of carbon, hydrogen, halogen and oxygen atoms, the latter being in the form of ether, ester or hydroxyl, attached to a silicon atom through a silicon-carbon bond, the divalent organic radical (1') linking the silicon-containing moiety and the carnauba wax moiety by at least 60 percent ether linkages and any remaining linkages being ester linkages, the silicon-containing moiety consisting of at least one silicon atom bonded to the divalent organic radical (1'), any remaining valences of the silicon atom being satisfied by radicals selected from the group consisting of monovalent hydrocarbon radicals having from 1 to 18 inclusive carbon atoms, monovalent halogenated hydrocarbon radicals having from 1 to 12 inclusive carbon atoms, monovalent hydrocarbonoxy radicals having from 1 to 12 inclusive carbon atoms, monovalent halogenated hydrocarbonoxy radicals having from 2 to 7 inclusive carbon atoms, hydroxyl radicals, hydrogen atoms, divalent oxygen atoms being bonded to another silicon atom forming a silicon-oxygen-silcon bond, the valences of the other silicon atom being satisfied by any of the radicals defined above for the silicon atom, and said copolymer being from 40 to 95 inclusive weight percent carnauba wax moiety, (D) a siloxane polymer consisting essentially of
(3) siloxane units of the formula $(CH_3)_3SiO_{0.5}$,
(4) siloxane units of the formula

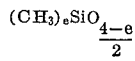

in which $e$ has an average value from 1.98 to 2.00 inclusive, and
(5) siloxane units of the formula

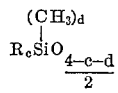

in which R is a monovalent hydrocarbon radical having from 16 to 26 inclusive carbon atoms, $c$ has an average value from 0.95 to 1.05 inclusive, $d$ has an average value from 0.95 to 1.05 inclusive and the sum of $c+d$ has an average value from 1.98 to 2.00 inclusive, there being an average of up to 2.05 inclusive units of (3) per molecule and there being an average of at least one unit of (5) per 15 units of (4), and (E) a silphenylene copolymer selected from the group consisting of a copolymer of the formula

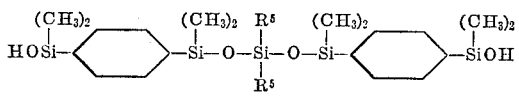

in which $R^5$ is a monovalent hydrocarbon radical selected from the group consisting of methyl, phenyl, vinyl and trifluoropropyl, and a copolymer consisting essentially of from 5 to 95 mol percent of units of

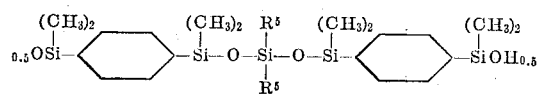

in which $R^5$ is defined above and from 5 to 95 mol percent of units of $RSiO_{1.5}$ in which R is defined above.

The organosilicon block copolymers (A) are silicone waxes and consist essentially of two types of blocks. The diorganopolysiloxane blocks, (1), are composed essentially of dimethylsiloxane units and have an average of from 6 to 150 silicon atoms per block. Organosilicon block copolymers, (A), containing diorganopolysiloxane blocks (1) with an average of less than 6 silicon atoms per block do not produce waxes which are compatible with silicone fluids. Organosilicon block copolymers, (A), containing diorganopolysiloxane blocks (1) with an average of more than 150 silicon atoms per block provide products which do not have wax properties. The most preferred average length of the diorganopolysiloxane blocks is from 15 to 100. The diorganopolysiloxane blocks can tolerate up to 5 mol percent of either phenylmethylsiloxane units or monomethylsiloxane units. More than 5 mol percent of either of the above units reduces the melting point of the wax below an operable level or interferes with the compatibility of silicone fluids.

Organosilicon blocks (2) are essentially monorganosilicon blocks of the unit formula

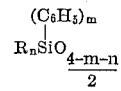

in which R is an alkyl radical containing from 16 to 26 carbon atoms, $m$ has a value up to 0.25, $n$ has a value from 0.75 to 1.05 and the sum of $m+n$ has a value from 0.95 to 1.05. Examples of alkyl radicals, R, which are operable are hexadecyl, heptadecyl, octadecyl, nonadecyl, eicosyl, heneicosyl, docosyl, tricosyl, tetracosyl, pentacosyl and hexacosyl. The alkyl radicals can be either straight chained or branched. The preferred alkyl radicals, especially for the preparation of organosilicon block copolymers for preparing lip coloring compositions are those having from 18 to 26 carbon atoms per radical.

The organosilicon blocks, (2), can have up to 0.25 phenyl radicals per silicon atom, and preferably (2) contains up to 0.10 phenyl radicals per silicon atom. The phenyl radicals can be present as monophenylsiloxane units, diphenylsiloxane units or units of the formula $R(C_6H_5)SiO$. The phenyl radicals are present preferably as monophenylsiloxane units. Units of the diorganosiloxane type such as $(C_6H_5)_2SiO$, $R(C_6H_5)SiO$ and $R_2SiO$ can be present up to 5 mol percent of the total siloxane units of (2). More than 5 mol percent of diorganosiloxane units lowers the melting point below an operable range.

The organosilicon blocks, (2), can have up to 5 mol percent of siloxane units of the formula $SiO_2$ based on the total mol percent of siloxane units in (2). Up to 5 mol percent of $SiO_2$ units aids in raising the melting point of the silicone wax and adds strength to the silicone wax. More than 5 mol percent of $SiO_2$ units causes the silicone wax to become brittle.

The organosilicon blocks, (2), contain from 75 to 100 mol percent of monoalkylsiloxane units based on the total number of units present in (2). The most preferred amount of monoalkylsiloxane units is from 90 to 100 mol percent.

The siloxane units in the siloxane blocks in (1) can be present in amounts from 5 to 94 mol percent based on the total mol percent of siloxane units in (1) and (2). The most preferred amount of siloxane units (1) is from 20 to 90 mol percent. The amount of siloxane units in the blocks of (2) can be from 6 to 95 mol percent based on the total mol percent of siloxane units in (1) and (2). Copolymers outside the limits of (1) and (2), as stated above, do not produce the desired waxes.

The organosilicon block copolymer (A) is essentially the only component of the silicone wax, but because the starting alkyl chlorosilanes are extremely difficult to prepare in pure form, other materials may be present such as alkanes with from 16 to 26 carbon atoms. These extra ingredients are not detrimental to the properties of the silicone waxes if the amounts present are relatively small.

The organosiloxane block copolymers of the present invention can be prepared by several methods. In one excellent method silanes, such as $RSiCl_3$, are coupled with $HO[ME_2SiO]_xH$ in the presence of an acid acceptor such as pyridine and an inert organic solvent such as toluene. The silane is present in an amount of at least one $RSiCl_3$ molecule per OH radical in the dimethylpolysiloxane. The chlorosilane can be prepared by any conventional technique such as the addition of an alpha-alkene to $HSiCl_3$ in the presence of a platinum catalyst. The coupling reaction is usually carried out in the absence of water. The reaction product from the coupling reaction, either with or without removing the pyridine hydrogen chloride which was formed during the reaction, is mixed with additional chlorosilanes such as $RSiCl_3$, $R_2SiCl_2$, $R(C_6H_5)SiCl_2$, $C_6H_5SiCl_3$ or $(C_6H_5)_2SiCl_2$ to produce the desired mol percentage of siloxane units for (2). All of the chlorosilanes can be added during the coupling step or some can be added during the coupling step and the remaining amount just before hydrolysis. The mixture is added to and mixed with water to hydrolyze the chlorosilanes. The amount of water is usually such that a 10 weight percent of hydrogen chloride in water is formed. The concentration of the hydrogen chloride in water is not limited to 10 weight percent but can vary from 1 to 20 weight percent. The hydrolysis is best carried out when some isopropanol is mixed with the water. The amount of isopropanol is not critical. After the hydrolysis the water layer is separated from the organic layer and discarded. The organic layer is washed free of acid by water washes or washes which contain bases such as $Na_2CO_3$. After neutralizing the acid in the organic layer the solvent can be removed by any conventional method, such as vacuum stripping. Conditions which cause siloxane bond rearrangement should not be used.

The organosilicon block copolymer (A) is a silicone wax which is insoluble in water, alcohol, and hot fats and oils. It is miscible with silicone fluids. It has a relatively high melting point and has sufficient strength to be molded and formed.

The hydrocarbon-silicone copolymer (B) is a wax and is essentially of two types. The first type is a copolymer having an average formula

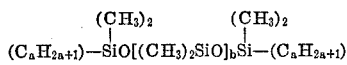

in which $a$ has an average value from 18 to 75 inclusive. The value of $a$ includes not only aliphatic radicals bonded directly to a silicon atom but also includes any aliphatic molecules which are not attached to a silicon atom. The aliphatic radicals can be for example any alkyl radical having at least 18 carbon atoms and no more than 75 carbon atoms, such as octadecyl, nonadecyl, eicosyl, heneicosyl, docosyl, tricosyl, tetracosyl, pentacosyl, hexacosyl, heptacosyl, octacosyl, nonacosyl, triacontyl, hentriacontyl, dotriacontyl, tritriacontyl, tetratriacontyl, pentatriacontyl, hexatriacontyl, heptatriacontyl, octatriacontyl, nonatriacontyl, tetracontyl, hentetracontyl, dotetracontyl, tritetracontyl, tetratetracontyl, pentatetracontyl, hexatetracontyl, heptatetracontyl, octatetracontyl, nonatetracontyl, pentacontyl, henpentacontyl, dopentacontyl, tripentacontyl, tetrapentacontyl, pentapentacontyl, hexapentacontyl, heptapentacontyl, octapentacontyl, nonapentacontyl, hexacontyl, henhexacontyl, dohexacontyl, trihexacontyl, tetrahexacontyl, pentahexacontyl, hexahexacontyl, heptahexacontyl, octahexacontyl, nonahexacontyl, heptacontyl, henheptacontyl, doheptacontyl, triheptacontyl, tetraheptacontyl and pentaheptacontyl. These radicals can be either straight chained or branched. The aliphatic radicals, $C_aH_{2a+1}$, can also include alkanes which are the precursor of any of the above alkyl radicals. These alkanes can be present and are unattached to the silicon atoms. These alkanes should not be present in such amounts so as to provide for less than 18 carbon atoms per end silicon atom or more than 75 carbon atoms per end silicon atom. Also the alkanes should not have less than 18 carbon atoms per molecule. It is understood that there are two alkyl radicals per compound, one attached to both end silicon atoms. The alkanes can be present because the starting ingredients are difficult to purify and even after reaction producing the above copolymers their removal is very difficult, therefore, as their presence is not detrimental to the final properties of the wax if the limits set forth are maintained, the extra cost involved in purification is an added unnecessary expense. Likewise all the aliphatic radicals and molecules need not be completely saturated, a small amount of carbon-carbon double bonds can be present, such as not more than 5 percent of the aliphatic radicals and molecules contain double bonds.

If there are fewer carbon atoms in $C_aH_{2a+1}$ than 18, the hydrocarbon-silicone copolymers of the first type are not satisfactory waxes for the preparation of cosmetic compositions of this invention. If there are more than 75 carbon atoms in $C_aH_{2a+1}$, the hydrocarbon-silicone copolymers of the first type contain excessive amounts of alkanes and are not satisfactory for this invention.

The silicon-containing portion of the copolymers of the first type can contain from 2 to 50 silicon atoms per molecule, thus the value of $b$ can be from 0 to 48 inclusive. If there are more than 50 silicon atoms per molecule, the waxes have too low a melting point to be satisfactory for this invention.

Another requirement for the copolymers of the first type is that they must contain at least 3 carbon atoms per silicon atom. The carbon atoms here counted are only those which are included in the $C_aH_{2a+1}$, the aliphatic radicals and molecules as described above. The silicon atoms are the total number of silicon atoms per molecule. When there are less than 3 carbon atoms per silicon atoms, the waxes have too low a melting point for the preparation of the cosmetic compositions of this invention.

The preferred compositions of the hydrocarbon-silicone copolymers of the first type are those in which $a$ has an average value from 22 to 50 inclusive, $b$ has an average value from 2 to 30 inclusive and there is at least 5 carbon atoms based on the total number of carbon atoms in the $C_aH_{2a+1}$ radicals per silicon atom based on the total number of silicon atoms per molecule.

An excellent method for preparing copolymers of the first type is to mix

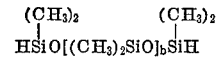

with olefins having terminal double bonds in the presence of a platinum catalyst. The mixture of the siloxane and olefin is usually heated to 70° to 150° C. before the platinum catalyst is added. The platinum catalyst is usually in a solvent such as isopropanol, ethanol or dimethylphthalate. The amount of platinum catalyst in any conventional form for SiH addition to carbon-carbon double bonds can be a very small amount such as 0.0001 weight percent or as much as 1 weight percent, preferably smaller amounts are used. After the platinum catalyst is added, the mixture is stirred and heated at a temperature from 60° to 160° C. from 10 minutes to 48 hours or until no SiH remains. Other temperatures are operative, but these are preferred. The mixture is usually then purified by mixing with a solvent such as xylene, mixing with diatomaceous earth and charcoal and then filtered. The solvents are removed by heating at reduced pressure.

The second type of hydrocarbon-silicone copolymer (B) is a copolymer having an average formula

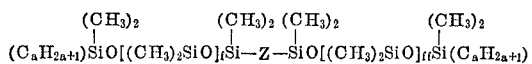

in which $a$ is defined above and $f$ has an average value from 0 to 10 inclusive, preferably $f$ has an average value from 0 to 6 inclusive. The divalent hydrocarbon radical, Z, consists essentially of —CH$_2$— groups and has from 1 to 10 carbon atoms. Thus, Z can be for example, methylene, ethylene, propylene, butylene, pentylene, hexylene, heptylene, octylene, nonylene and decylene. Although it is preferred that Z is essentially a straight chain, branched chains in small amounts can be present.

The copolymers of the second type can be prepared by reacting 2 moles of

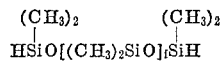

with one mole of a diene such as 1,3-butadiene, 1,4-pentadiene or 1,7-octadiene in the presence of a platinum catalyst as described above. The C$_a$H$_{2a}$ olefin is reacted with the unreacted silicon hydrogen groups to form a copolymer of the second type. When a copolymer of the second type contains a Z with less than 4 carbon atoms, conventional Grignard reactions are used.

The silicone-carnauba wax copolymers (C) are waxes and consist essentially of a silicon-containing moiety bonded to a carnauba wax moiety through an organic radical attached to a silicon atom through a silicon-carbon bond, said organic radical linking the silicon-containing moiety and the carnauba wax moiety predominantly by ether linkages and said copolymer being from 40 to 95 inclusive weight percent carnauba wax moiety.

The silicon-containing moiety consists essentially of at least one silicon atom to which is bonded through a silicon-carbon bond at least one divalent organic radical (1′) consisting essentially of carbon atoms, hydrogen atoms and oxygen atoms, and having from 2 to 92 carbon atoms per divalent organic radical (1′). The organic radical is also bonded to a carnauba wax moiety predominantly through an ether linkage. Any remaining valences of the silicon atom are satisfied by radicals such as monovalent hydrocarbon radicals having from 1 to 18 carbon atoms such as methyl, ethyl, propyl, butyl, hexyl, cyclohexyl, cyclopentyl, phenyl, tolyl, xenyl, naphthyl, octadecyl, tertiary butyl and ethylphenyl and beta-phenylethyl radicals; monovalent halogenated hydrocarbon radicals having from 1 to 12 carbon atoms, such as chloromethyl, chloropropyl, trifluoropropyl, pentafluoropentyl, chlorophenyl, bromobutyl, fluoroethyl, bromophenyl and chloropentyl radicals; monovalent hydrocarbonoxy radicals having from 1 to 12 carbon atoms, such as methoxy, ethoxy, propoxy, butoxy, phenoxy, hexoxy, beta-methoxyethoxy, beta-ethoxyethoxy, gamma-methoxypropoxy and beta-phenoxyethoxy radicals; monovalent halogenated hydrocarbonoxy radicals having from 2 to 7 carbon atoms, such as chloroethoxy, trifluoropropoxy, bromobutoxy, chlorophenoxy and pentafluoroheptoxy radicals; hydroxyl radicals; hydrogen atoms; and divalent oxygen atoms. The divalent oxygen atoms are bonded to another silicon atom forming a silicon-oxygen-silicon bond. The other silicon atom has its valences satisfied by any of the radicals described above.

The silicon carnauba wax copolymers (C) consist essentially of a silicon-containing moiety bonded to a carnauba wax moiety predominantly by ether linkages such as (silicone)-CY$_k$—O—CH$_2$— (carnauba wax) linkage, wherein the ether linkage is a divalent oxygen bonded to two carbon atoms, said carbon atoms not being bonded to any double bonded oxygen atoms. Since carnauba wax does contain some free acid groups (—COOH), the silicone-carnauba wax copolymer (C) can also contain some ester linkages such as

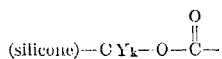

(carnauba wax) linkages, wherein the ester linkage is

where the oxygen valence is bonded to a carbon atom, said carbon atom not being bonded to any other double bonded oxygen atom.

The silicon-containing moiety, (silicone)-CY$_k$—, can be of a formula such as

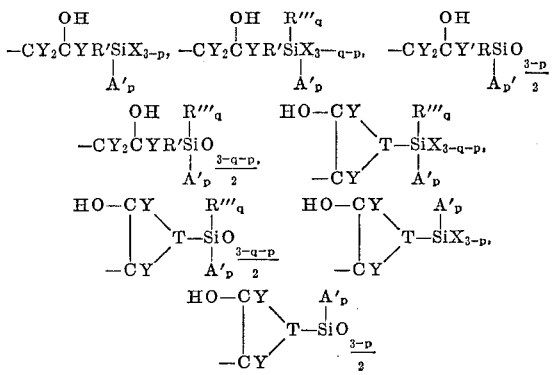

mixtures thereof, copolymers thereof, and copolymers consisting essentially of from 0.001 to 99.999 mol percent units of a formula selected from the group consisting of

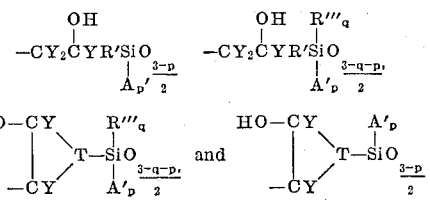

and 0.001 to 99.999 mole percent units of the formula selected from the group consisting of SiO$_{4/2}$, R‴SiO$_{1.5}$, R‴$_2$SiO, and R‴$_3$SiO$_{0.5}$. In the silicon-containing moiety, $k$ is an integer from 1 to 2 inclusive. When $k$ is 1, the —CY$_k$— group is bonded to two carbon atoms exclusive of carbon atoms in the Y radicals such as

and when $k$ is 2, the —CY$_k$— group is bonded to only one other carbon atom exclusive of the carbon atoms of the Y radicals.

Y can by any organic radical such as a hydrogen atom; a monovalent hydrocarbon radical having from 1 to 18 carbon atoms, such as methyl, ethyl, propyl, butyl, hexyl, octadecyl, phenyl, tolyl, xylyl, xenyl or cyclohexyl radicals; a halogenated monovalent hydrocarbon radical such as a chloromethyl, trifluoropropyl, chlorophenyl, bromohexyl, pentafluorobutyl, bromoxenyl or α,α,α-trifluorotolyl radicals and a hydroxylated hydrocarbon radical such as hydroxypropyl, 3-hydroxybutyl or hydroxyhexyl radicals. X is a hydroxyl radical or a hydrocarbonoxy radical of the formula —OR″ in which R″ is a monovalent hydrocarbon radical having from 1 to 12 carbon atoms, such as methyl, ethyl, propyl, butyl, dodecyl, phenyl, fluorobutyl, α,α,α-trifluorotolyl, chloropropyl, chlorophenyl or —CH$_2$CH$_2$OCH$_2$CH$_3$,

—CH$_2$CH$_2$CH$_2$OCH$_3$, —(CH$_2$)$_4$—O—CH$_2$CH$_3$

—(CH$_2$)$_3$OC$_6$H$_5$ or —CH$_2$CH$_2$OCH$_3$ radicals.

R‴ is a hydrogen atom, a monovalent hydrocarbon radical having from 1 to 18 carbon atoms such as methyl, ethyl, butyl, phenyl, tolyl, xylyl, octadecyl or cyclohexyl radicals or a monovalent halogenated hydrocarbon radical having from 1 to 12 carbon atoms such as chloromethyl, trifluoropropyl, chlorophenyl, bromohexyl, pentafluorobutyl or bromoxenyl radicals. R′ is any divalent organic radical having from 1 to 36 carbon atoms, such as hydrocarbon radicals such as methylene, ethylene, butylene, hexylene, octadecylene, phenylene, xenylene, tolylene, xylylene or

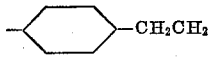

any hydroxylated hydrocarbon radical; any halohydrocarbon radical such as chloroethylene, fluoroethylene, bromophenylene, chloropentylene, and bromoxenylene and any divalent ether radical of the type $(R^4OR^4)_w$ where each $R^4$ can be any of the group listed under $R'$ and $w$ is an integer of at least 1.

Specific examples of such divalent ether groups are

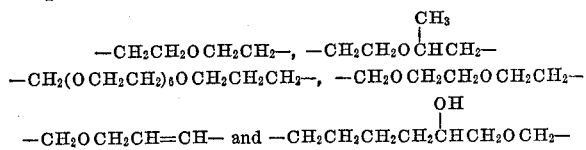

—CH₂OCH₂CH=CH— and —CH₂CH₂CH₂CH₂ĊHCH₂OCH₂—

The T radical is a trivalent radical having from 1 to 31 carbon atoms, such as hydrocarbon radical such as

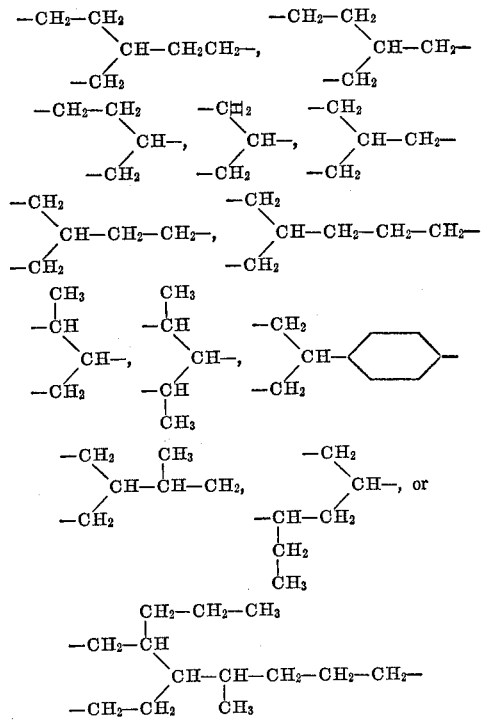

radicals; hydroxylated hydrocarbon radicals such as

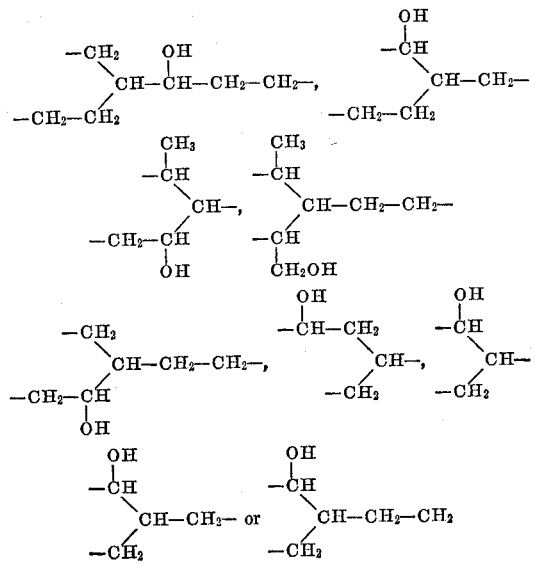

radicals; halogenated hydrocarbon radicals such as,

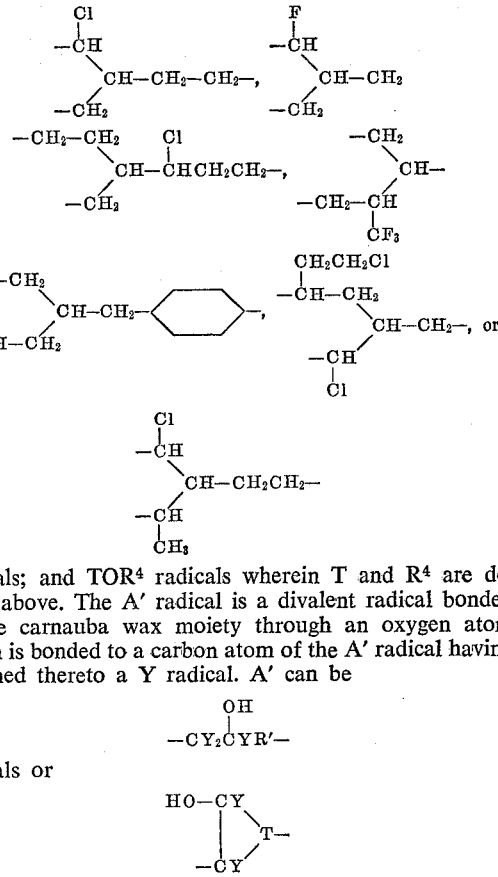

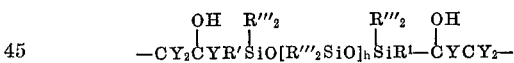

radicals; and TOR⁴ radicals wherein T and R⁴ are defined above. The A' radical is a divalent radical bonded to the carnauba wax moiety through an oxygen atom which is bonded to a carbon atom of the A' radical having attached thereto a Y radical. A' can be $$-CY_2\overset{OH}{\underset{|}{C}}YR'-$$

radicals or

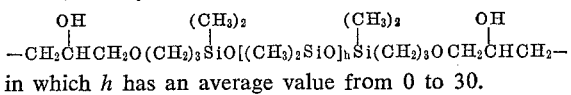

radicals. In the silicon-containing moiety, $p$ can be 0, 1, 2 or 3 and $q$ can be 0, 1, 2 or 3.

One of the preferred silicone-carnauba wax copolymers (C) consists essentially of a silicon-containing moiety of the formula $$-CY_2\overset{OH}{\underset{|}{C}}YR'\overset{R'''_2}{\underset{|}{S}}iO[R'''_2SiO]_h\overset{R'''_2}{\underset{|}{S}}iR'-\overset{OH}{\underset{|}{C}}YCY_2-$$

in which Y, R' and R''' are previously defined herein and $h$ has an average value from 0 to 100 inclusive. The silicon-containing moiety is bonded to a carnauba wax moiety predominantly through ether linkages. Preferably, Y is a hydrogen atoms, R''' is a methyl radical and $h$ has an average value from 0 to 50 inclusive. Preferred silicone-carnauba wax copolymer (C) species consist essentially of a carnauba wax moiety and a silicon-containing moiety of the formula $$-CH_2\overset{OH}{\underset{|}{C}}HCH_2O(CH_2)_3\overset{(CH_3)_2}{\underset{|}{S}}iO[(CH_3)_2SiO]_h\overset{(CH_3)_2}{\underset{|}{S}}i(CH_2)_3OCH_2\overset{OH}{\underset{|}{C}}HCH_2-$$

in which $h$ has an average value from 0 to 30.

Another preferred silicone-carnauba wax copolymer (C) consists essentially of a carnauba wax moiety bonded to a silicon-containing moiety predominantly through ether linkages. The silicon-containing moiety is

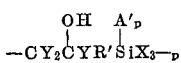

in which Y, R', X and $p$ are previously defined herein and A' is a divalent radical of the formula

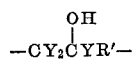

which is bonded to the carnauba wax moiety through an oxygen atom in turn attached to the carbon atom which is attached to a Y radical. Preferably, Y is a hydrogen atom, X is an alkoxy and R' is a $-(R^4OR^4)_w$ and $p$ is 0.

Another preferred silicone-carnauba wax copolymer (C) consists essentially of a carnauba wax moiety bonded to a silicon-containing moiety predominantly through ether linkages. The silicon-containing moiety is of the formula

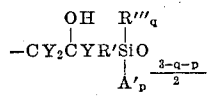

in which Y, R' and R''' are defined above, A' is a divalent radical of the formula

which is bonded to the carnauba wax moiety through an oxygen atom in turn attached to the carbon atom which is attached to a Y radical, $p$ is 0, 1 or 2 and $q$ is 0, 1 or 2. Preferably, Y is a hydrogen atom, R''' is a methyl radical, $q$ is 1 and $p$ is 0.

The carnauba wax moiety is carnauba wax or hydrolyzed carnauba wax wherein the hydroxyl radicals form ether linkages with the silicon-containing moiety and the free carboxylic acid groups form ester linkages with the silicon-containing moiety when conditions favor such a reaction.

Carnauba wax is a product found in nature and is scientifically identified as *Corypha cerifera*. Carnauba wax is primarily obtained in three forms, commonly known as yellow, crude and refined. Carnauba wax is essentially a mixture of high molecular weight esters of two types, one type being esters of n-alkanoic acids having from 18 to 30 carbon atoms and n-aliphatic alcohols having from 24 to 34 carbon atoms and the other type being esters of omega-hydroxy-n-alkanoic acids having from 18 to 30 carbon atoms and n-aliphatic alcohols. Carnauba wax also contains free acids and alcohols, hydrocarbons, resins and esters of aliphatic diols. The above analysis of carnauba wax is intended to provide a better understanding of the present invention and should not be construed as limiting the invention as otherwise described herein. Any carnauba wax is operable in the present invention, such as carnauba wax which is partially or completely hydrolyzed and carnauba wax which is found in nature. Carnauba wax has a solidifying point of 86° to 90° C.

Carnauba wax contains a large amount of unreacted hydroxyl radicals. These hydroxyl radicals react with epoxy groups which are attached to a silicon atom of the silicon-containing compounds to form the silicone-carnauba wax copolymer (C). The linkages formed by this reaction are ether linkages.

The linkages which bond the silicon-containing moiety and the carnauba wax moiety are predominantly ether linkages. By the term predominantly it is meant that a majority of the linkages are ether linkages, such as at least 60 percent of all the linkages bonding the carnauba wax moiety and the silicon-containing moiety. Any of the remaining linkages are ester linkages. The word predominantly is used because different carnauba waxes have varying amounts of unreacted carboxylic acid groups and different methods of preparing the copolymers of this invention produce varying amounts of ester linkages. In some cases the preparation produces almost exclusively ether linkages. When a hydrolyzed carnauba wax is used, the amount of free acid increases and thus the amount of possible ester linkages increases under favorable conditions. It is preferred that less than 10 percent of the linkages are ester linkages as ester linkages can be more readily hydrolyzed than ether linkages.

The silicone carnauba wax copolymer (C) is best prepared by mixing molten carnauba wax with an epoxy silicone in the presence of suitable catalyst. Suitable catalysts for the reaction are for example, tertiary amines, quaternary ammonium hydroxides, alkali hydroxides and Lewis acids such as boron trifluoride, tin tetrachloride and aluminum trichloride. The preferred catalysts are the Lewis acids such as boron trifluoride and tin tetrachloride since these catalysts give a more specific epoxy-hydroxyl reaction and thus produce fewer ester linkages. The reaction can also be carried out in a suitable organic solvent in order to use milder reaction temperatures. Suitable organic solvents include any neutral solvent free of active hydrogens such as esters, ethers, ketones, hydrocarbons, tertiary amines and amides. Examples of suitable organic solvents are benzene, ethylene glycoldimethylether, dioxane, toluene, hexane, butylacetate, methylbutyl ketone and chlorobenzene. Organic solvents such as primary and secondary amines, alcohols, phenols and carboxylic acids should not be used.

The amount of epoxy silicone used should be such that there is not more than 1.5 epoxy groups in the epoxy silicon-containing compound per 1.0 hydroxyl radicals in the carnauba wax. Preferably, there is one epoxy group per one hydroxyl group. The amount of carnauba wax moiety present can be from 40 to 95 weight percent based on the combined weight of the silicon-containing moieties and the carnauba wax moieties. Preferably the amount of silicon-containing moieties are present in an amount from 15 to 40 weight percent.

The epoxy silicon containing compounds operable in this invention which can be reacted with the carnauba wax are those which contain an epoxy bearing organic radical bonded to a silicon atom through a silicon-carbon bond. This organic radical contains an epoxy group which for the purpose of this invention the term "epoxy group" refers to the group

The organic radicals containing epoxy groups preferably are composed of carbon, hydrogen and oxygen. Specific examples of silicon bonded epoxy containing organic radicals are

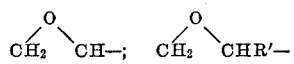

in which R' is defined above.

Other examples of silicon bonded epoxy bearing organic radicals are those of the formula

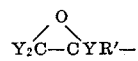

in which R' and Y are defined above.

The epoxy silicon containing compounds can be silanes or siloxanes, therefore the silicon-containing compound consists essentially of at least one silicon atom to which is bonded at least one epoxy bearing organic radical. The silanes can be of the formula $A_rSiX_{4-r}$ in which A is an epoxy containing organic radical bonded to the silicon atom through a silicon-carbon bond, X is defined above and $r$ has a value from 1 to 4 inclusive. Other silanes are those of the formula $A_rR'''_qSiX_{4-q-r}$ in which A, R''' and X are defined above, $q$ has a value from 1 to 3 inclusive and $r$ has a value from 1 to 3 inclusive. The siloxanes can be of the formula

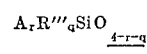

in which A and R''' are defined above, $r$ has a value from 1 to 3 and $q$ has a value from 0 to 2. These siloxanes can be prepared by hydrolyzing or condensing the corresponding silanes where X is a hydrolyzable group or a condensable group.

The siloxanes can be homopolymers in which each silicon atom contains at least one epoxy bearing organic radical or they can be copolymers in which each silicon atom contains at least one epoxy bearing organic radical. The siloxanes can also be copolymers in which only some of the silicon atoms contain at least one epoxy bearing organic radical and the remaining silicon atoms are substituted with monovalent radicals such as hydrocarbon radicals, halohydrocarbon radicals, hydroxyl radicals, hydrocarbonoxy radicals, halohydrocarbonoxy radicals, hydrogen atoms and divalent oxygen atoms which are bonded to another silicon atom. These copolymers can have from 0.001 mol percent to 99.999 mol percent siloxane units having at least one epoxy bearing organic radical. The copolymer having at least 0.1 mol percent siloxane units having at least one epoxy bearing organic radical are preferred.

The following are specific examples of epoxy containing organosilicon compounds:

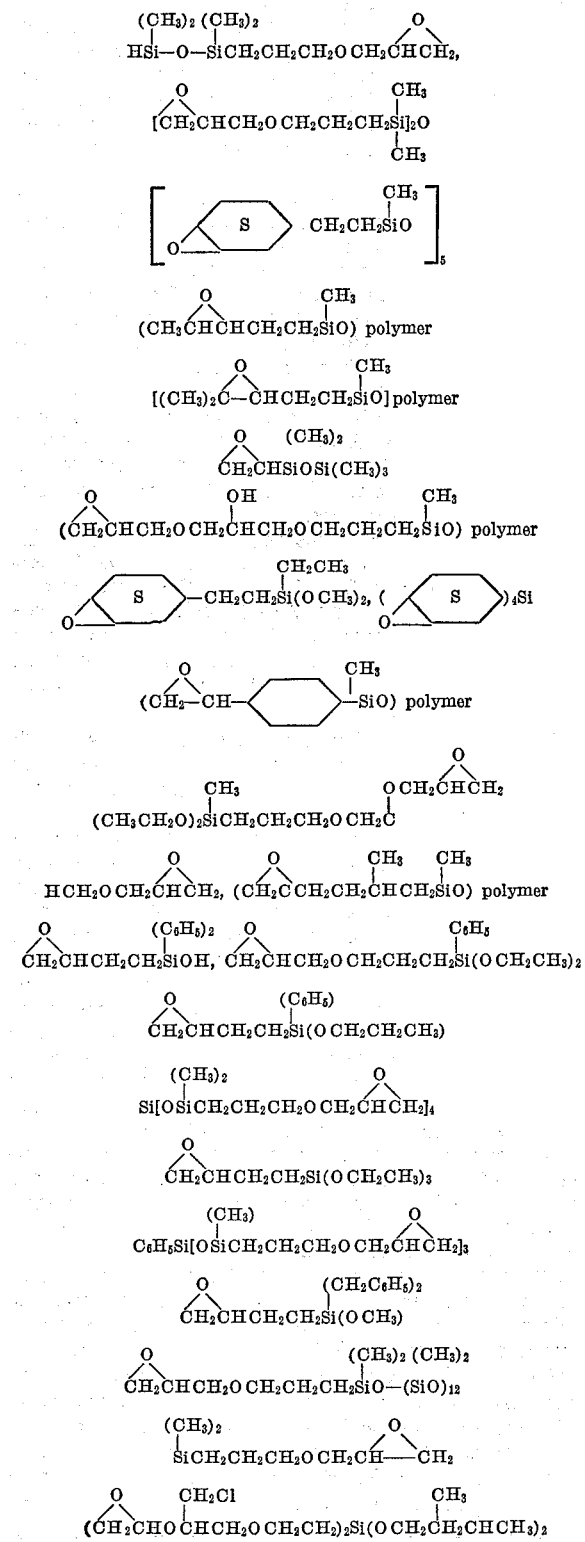

a copolymer of 5 mol percent

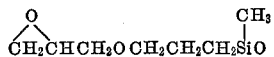

units and the remainder $(CH_3)_2SiO$ units and $$(CH_3)_3SiO_{0.5}$$

units,

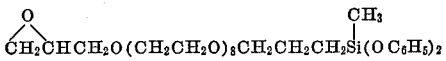

a copolymer of 30 mol percent $(C_6H_5)(CH_3)SiO$ units, 20 mol percent

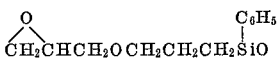

units and 50 mol percent

units,

a copolymer of 50 mol percent $(C_6H_5)(CH_3)SiO$ units and 50 mol percent

units,

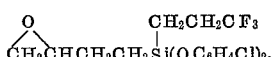

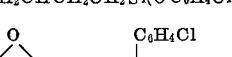

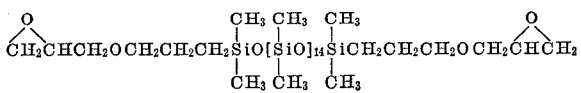

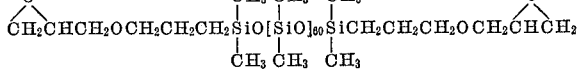

a copolymer of 40 mol percent

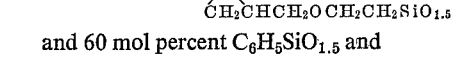

and 60 mol percent $C_6H_5SiO_{1.5}$ and

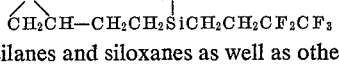

The above silanes and siloxanes as well as others described herein can be prepared as described in Canadian Pat. No. 580,908, issued Aug. 4, 1959.

The most preferred epoxy containing silicon compounds are those of the formula

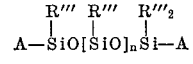

where A and R''' are defined above and $h$ has an average value from 0 to 100, and $A_rSiX_{4-r}$ where A and X are defined above and $r$ has a value from 1 to 3 inclusive.

A siloxane copolymer (D) of this invention is a wax and consists essentially of $(CH_3)_3SiO_{0.5}$ units (3),

units (4) in which $e$ has an average value from 1.98 to 2.00 inclusive and

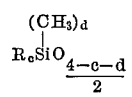

units (5) in which R is an alkyl radical having from 16 to 26 inclusive carbon atoms, $c$ has an average value from 0.95 to 1.05 inclusive, $d$ has an average value from 0.95 to 1.05 inclusive and the sum of $c+d$ has an average value from 1.98 to 2.00 inclusive. The trimethylsiloxane units (3) are present in an amount up to 2.05 units per molecule and there is present an average of at least one unit of (5) for each 15 units of (4). When there are less than one unit of (5) for each 15 units of (4), the copolymer has a melting point which is too low for this invention. The upper limit is when there are no units of (4) present. The alkyl radicals, R, have previously been described herein. The above formulae permit a small amount of monomethyl siloxane units and/or a small amount of $RSiO_{1.5}$ units. Other units can also be present, so long as they do not intefere with the properties of this copolymer. These other siloxane units can be units containing silicon bonded hydrogen, lower alkyl radicals and phenyl radicals. Copolymer (D) can also contain unreacted alkane molecules.

The siloxane copolymers (D) can be prepared by reacting an alpha-olefin with a methylhydrogenpolysiloxane in the presence of chloroplatinic acid. An alpha-olefin corresponding to R on the silicon atom of

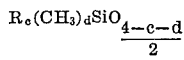

can be reacted with an Si—H containing polysiloxane in which there is at least one SiH for each silicon atom. Mixtures of alpha-olefins can also be reacted. The platinum catalyzed reaction is known in the art. The amount of platinum can be from $1 \times 10^{-3}$ to $1 \times 10^{-7}$ moles of platinum per mole of alpha-olefin. The reaction is usually carried out in an organic solvent which is free from reactive hydrogens and at a temperature above room temperature, such as 100° C. to 175° C., although the reaction will proceed at room temperature.

Preferably, the siloxane copolymers (D) contain at least one unit of (5) for each 5 units of (4). Also, preferred siloxane copolymers (D) are those having R radicals with at least 20 carbon atoms per radical.

The silphenylene copolymers (E) are silicone waxes and can be two types of copolymers. The silphenylene copolymers of the first type are of the formula

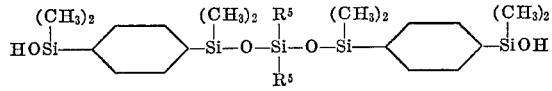

in which $R^5$ can be a methyl, phenyl, vinyl or trifluoropropyl radical. The silphenylene copolymers of the second type essentially contain from 5 to 95 mol percent of silphenylene units of the formula

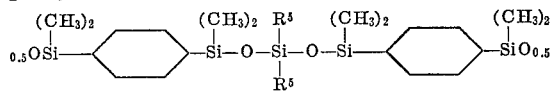

in which $R^5$ is defined above and from 5 to 95 mol percent of units of the formula $RSiO_{1.5}$ in which R is defined above. The copolymers preferably contain from 15 to 80 mol percent of the silphenylene units.

The silphenylene copolymers of the first type can be prepared by reacting 2 moles of

with 1 mole of $R^5SiCl_2$. The reaction is best carried out in a suitable solvent, such as toluene or acetone in the presence of an acid acceptor such as pyridine. The silphenylene copolymer can be recovered by washing the acid acceptor-hydrogen chloride from the solution-mixture, and then stripping the solvents by heating at reduced pressure.

Tht silphenylene copolymer of the second type can be prepared by mixing the silphenylene copolymers of the first type with $RSiCl_3$. The reaction can be carried out in a solvent such as toluene or acetone and also in the presence of an acid acceptor such as pyridine. The mixture is hydrolyzed and then the acid acceptor-hydrogen chloride is removed and the solvents removed by heating at reduced pressure.

The compositions of this invention are improved cosmetic compositions, particularly improved lip coloring compositions, such as lipsticks. The cosmetic compositions which comprise a wax, a solvent and a coloring agent are improved compositions in that for at least a portion of the wax, a silicone wax is substituted. The cosmetic compositions containing a silicone wax have improved viscosity stability and have a sharper melting point. Thus the compositions retain their form and properties almost to the melting point of the wax. The silicone waxes are essentially insoluble in water, ethanol and organic fats and oils, particularly those which are edible. The cosmetic compositions are improved over those compositions which contain no silicone wax in that the cosmetic compositions containing a silicone wax retain essentially all of their properties over a wide temperature range, are less soluble in organic solvents broadly and have good shelf stability.

The compositions of this invention are suitable for the preparation of any cosmetic such as a lipstick, a rouge, a chapstick, eyebrow stick, a lip coloring composition such as in liquid form, mascara, epilating wax, solid perfume, styptic crayon and the like. The compositions of this invention are particularly suitable for making lipstick compositions. The properties of a lipstick comprising a wax of which at least a portion is a silicone wax, a solvent and a coloring agent are such that a superior lipstick can be formed. Although the following description shall be directed primarily to a lip coloring composition, the present invention should not be considered as excluding other related cosmetic compositions that have a wax base.

Lip coloring compositions comprise from 2 to 70 inclusive weight percent of a wax of which 15 weight percent is a silicone wax, from 10 to 50 inclusive weight percent of a solvent and from 2 to 25 inclusive weight percent of a coloring agent which includes pigments, dyes and lakes. Preferably, the lip coloring compositions comprise 20 to 60 inclusive weight percent wax of which at least 15 weight percent is a silicone wax.

The waxes can be, for example, any silicone wax such as the silicone copolymers described above, and any organic wax suitable for cosmetic compositions such as beeswax (*Apis mellifera*), paraffin wax, carnauba wax (*Corypha cerifera*), ceresine, cocoa butter (*Theobroma cocao*), ozokerite, candelilla (*Euphorbia cerifera*), spermaceti (Cetaceum), hydrogenated vegetable oils such as hardened castor oil and hydrogenated palm kernel oil, montan, microcrystalline waxes, lanolin alcohols and waxes derived from the Fischer-Tropsch synthesis. Mixtures of waxes can be used in this invention. The improvements are observed in the cosmetic compositions when 15 weight percent of the wax mixture is a silicone wax, particularly a silicone copolymer as previously described. Preferably, the wax mixtures contain at least 25 weight percent silicone wax. Excellent results are obtained when the wax portion is all silicone.

The solvents used in this invention are cosmetic solvents and include silicone fluids, which preferably have a viscosity of at least 5 centistokes, such as dimethylpolysiloxane, diethylpolysiloxane, ethylmethylpolysiloxane, phenylmethylpolysiloxane and copolymers of dimethylsiloxane and phenylmethylsiloxane and organic solvents such as castor oil, liquid paraffin fractions, mineral oil, tetrahydrofurfuryl alcohol, organic esters of tetrahydrofurfuryl alcohol, isopropyl myristate, oleyl alcohol, polyethylene glycols, polypropylene glycols, mixed polyethylene and polypropylene glycols, organic esters of polypropylene and polyethylene glycols, glyceryl monostearate, butyl stearate, diethylsebacate, hexaethylene glycol, phenylethyl alcohol, diacetone alcohol, benzyl alcohol, tetraethylene glycol, N-hydroxyethyl acetamide, N-methylacetamide, N,N-dimethylacetamide, hydroxycitronellal, citral, triethylene glycol, acetone, diphenylketone, diethylene glycol, terpineol, ethylene ricinoleate, cyclohexanol, ethyl ricinoleate acetate, ethylene glycol, lauryl alcohol, myristyl alcohol, stearyl alcohol, gycol oleate acetate, cocoa butter, lauric acid, myristic acid, cetyl acetate, ethyl oleate, ethyl stearate, glycol oleate, cetyl alcohol, lanolin, lanolin absorption bases, petroleum jelly, isopropyl palmitate, lecithin, lard (purified, deodorized and decolorized), diethylene glycol monostearate, propylene glycol monostearte, vegetable oils, myristol lactate, sesame oil, olive oil and propylene glycol monolaurate. Although many of the above cosmetic solvents have properties over and above the solvent property, these cosmetic solvents are included with the solvent class. Each of the particular solvents have properties which are well known to those skilled in the art of cosmetics, such as cetyl alcohol, lanolin and cocoa butter have an emollient property.

The coloring agents include dyes, pigments both inorganic and organic and lakes. Dyes include the fluoran type dyes such as the fluoresceins and halogenated fluoresciens and their alkali metal salts and the xenthene type dyes including the triphenyl methane type dyes. Examples of dyes are 4,5-dibromo-3,6-fluorandiol (D & C Orange No. 5);
2,4,5,7-tetrabromo-12,13,14,15-tetrachloro-3,6-fluorandiol (D & C Red No. 27);
4,5-dichloro-3,6-fluorandiol (D & C Orange No. 8);
2,4,5,7-tetrabromo-3,6-fluorandiol (D & C red No. 21);
3-ethochloride of 9-orthocarboxyphenyl-6-diethylamino-3-ethylimino-3-isoxanthene (D & C Red No. 19);
3-ethoacetate of 9-orthocarboxyphenyl-6-diethylamino-3-ethylimino-3-isoxanthene (D & C Red No. 20);
the disodium salt of 9-ortho-carboxyphenyl-6-hydroxy-4,5-diiodo-3-isoxanthone (D & C Orange No. 11);
the sodium salt of tetra-iodo-fluorescein (FD & C Red No. 3);
disodium dibromofluorescein (D & C Orange No. 6);
potassium dibromofluorescein (D & C Orange No. 7);
dichlorofluorescein (D & C Orange No. 8);
disodium dichlorofluorescein (D & C Orange No. 9);
diiodofluorescein (D & C Orange No. 10);
erythrosine yellowish K (D & C Orange No. 12);
erythrosine yellowish NH (D & C Orange No. 13);
4,5,15-tribromo-2,7-dicarboxy-3,6-fluorandiol (D & C Orange No. 14);
dibromodiiodofluorescein (D & C Orange No. 16);
amaranth, purified cosine y, tartarzine, yellow ochre,
Rhodamine beta-acetate (D & C Red No. 20);
tetrachlorofluorescein (D & C Red No. 24);
sodium tetrachlorofluorescein (D & C Red No. 25);
potassium tetrachlorofluorescein (D & C Red No. 26);
uranine (D & C Yellow No. 8);
potassium salt of uranine (D & C Yellow No. 9);
the sodium salt of pseudocumylazo-beta-naphthol-3,6-disulfonic acid (FD & C Red No. 1);
the sodium salt of 4-sulfo-alpha-naphthylazo-beta-naphthol-3,6-disulfonic acid (FD & C Red No. 2);
the sodium salt of 2,4-dinitro-alpha-naphthol-7-sulfonic acid (FD & C Yellow No. 1;
carmine and carmoisine.

Examples of pigments are aluminum oxide, titanium oxide, zinc oxide, barium sulfate, iron oxide, carbon, talc, kaolin, clay and bentonite.

Other ingredients can also be present, but are not required to provide the improved cosmetic composition of this invention. Flavors and/or perfumes can be added such as strawberry, raspberry, vanillin, orange blossom, jasmin, rose, rose otto, heliotropin, linalyl cinnamate, benzyl propionate, anisic aldehydre and esesential perfume oils. The flavor and perfumes are usually added in amounts of up to 2 weight percent.

Any of the ingredients conventionally used in the preparation of wax base cosmetic compositions such as lipsticks, lip rouge and eyebrow pencil, can be used in this invention. The silicone waxes have a particular advantage in that can be formulated into excellent cosmetics without using a large number of ingredients. Cosmetic compositions such as lipsticks can be prepared from as few as four ingredients and have excellent properties. A lipstick can be prepared from a silicone wax, a silicone fluid, a coloring agent and a solvent with binding properties such as cetyl alcohol. Other ingredients can be used and those skilled in the art can readily include such other ingredients as may be desirable to provide a cosmetic composition with different properties such as a liquid lip rouge may be desired. In preparing a liquid lip rouge, the binding agent can be left out or some additional liquifying solvents can be added.

The cosmetic compositions can be prepared by conventional methods which are well known in the art. The ingredients can be mixed thoroughly, preferably all the ingredients which can be liquified are in the liquid state, such as the waxes. The pigments are added in a finely divided state. The ingredients can be milled together, or blended in any conventional manner.

The cosmetic compositions are insoluble in water and ethanol. The silicone waxes are also insoluble in organic fats and oils, particularly the edible organic fats and oils. The cosmetic compositions, particularly the lipsticks, retain essentially the same melting point as the melting point of the silicone wax. This is a unique property in that most waxes when used in a mixture will have a much lower melting point that the melting point of the wax used.

The preferred silicone copolymers of this invention are the organosilicon block copolymers (A), the hydrocarbon-silicone copolymers (B) and the silphenylene copolymers (E). The most preferred silicone copolymer is the organosilicon block copolymer (A).

The following examples are illustrative only and should not be construed as limiting the invention which is properly delineated in the appended claims.

EXAMPLE 1

A mixture of 100 g. of carnauba wax, 200 g. of isopropanol, 100 g. of toluene and 100 g. of a solution of 10 weight percent NaOH in water was refluxed for 6 hours to saponify the carnauba wax. The hot reaction mixture was then acidified with aqueous sulfuric acid and thereafter washed twice with boiling water. The organic layer was stripped to 150° C. at 1 mm. Hg. A smooth, hard wax melting at 75° to 76° C. was recovered.

A mixture of 10 g. of the above hydrolyzed carnauba wax, 10 g. of ethylene glycol dimethylether and 5 drops of $BF_3 \cdot CH_3CH_2OCH_2CH_3$ was heated to 100° C. and then 6 g. of

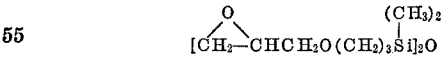

was added. The mixture was then stripped to 120° C. at 1 mm. Hg. The product, a silicone-carnauba wax, was a smooth wax melting at about 80° C.

A lipstick was prepared by melting and mixing 3.5 g. of the above silicone-carnauba copolymer, 2.0 g. of a dimethylpolysiloxane fluid having a viscosity of 10 centistokes at 25° C., 0.6 g. of cetyl alcohol, 1.0 g. of isopropyl myristate and 1.0 g. D & C Red No. 7, until a homogeneous mixture resulted. The melted mixture was then poured into a mold and cooled. The lipstick marked excellently.

A lipstick was prepared by mixing and melting the following ingredients until a homogeneous mixture was produced: 3.0 g. of the above silicone-carnauba copolymer, 3.0 g. of a phenylmethylpolysiloxane fluid having a viscosity of 50 centistokes at 25° C., 0.6 g. of cetyl alcohol and 1.0 g. of D & C Red No. 7. The molten mixture was poured into a mold and cooled. The lipstick was creamy and marked excellently.

A creamy lipstick was prepared by the above procedure and formulated with 3.0 g. of the above silicone-carnauba copolymer, 3.0 g. of a phenylmethylpolysiloxane fluid having a viscosity of 50 cs. at 25° C., 0.5 g. of stearic acid and 1.0 g. of D & C Red No. 7.

EXAMPLE 2

A solution of 50 g. of carnauba wax in 50 g. of ethylene glycol dimethylether was warmed to 80° C. and then 10 drops of $BF_3 \cdot CH_3CH_2OCH_2CH_3$ were added. A warm solution of 40 g. of

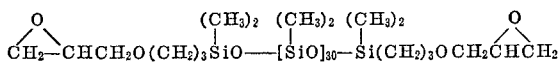

in 40 g. of ethylene glycol dimethylether was added with stirring. The mixture was warmed for 10 minutes at 80° C. and then stripped to 160° C. at 1 mm. Hg to remove the solvent. The clear liquid residue solidified to a smooth soft wax, a silicone-carnauba wax copolymer that melted at 80° to 85° C.

A lipstick was prepared by the procedure of Example 1 and the formulation was 4.0 g. of the above silicone-carnauba wax copolymer, 0.5 g. of a dimethylpolysiloxane fluid having a viscosity of 10 cs. at 25° C., 0.3 g. of stearic acid, 1.0 g. of isopropyl myristate, and 1.0 g. of D & C Red No. 12. The lipstick was very creamy, marked evenly and was not dull, heavy or greasy. The above lipstick was placed in a 150° F. oven for 15 minutes along with a commercial lipstick. The above lipstick remained unchanged while about half of the commercial lipstick melted and the coloring was uneven and the separated fluids remained separated.

EXAMPLE 3

Lipsticks were prepared by formulating the ingredients as shown in Table I by the procedure of Example 1. The organosilicon block copolymers were prepared by adding a toluene solution of a hydroxylated dimethylpolysiloxane to a toluene solution of a $RSiCl_3$ and pyridine with continuous agitation. The solution was then hydrolyzed by mixing with a water-isopropanol solution. The organic layer was separated from the aqueous layer and washed neutral. The organic layer was then stripped by reduced pressure to 120° C., thus producing the organosilicon block copolymer.

TABLE I

Formulation 1

3.0 g. of an organosilicon block copolymer consisting of 60 mol percent of a dimethylpolysiloxane block having an average of 44 silicon atoms per block and 40 mol percent of a block consisting of octadecylsiloxane units,
1.0 g. of a dimethylpolysiloxane fluid having a viscosity of 10 cs. at 25° C.,
0.3 g. of glyceryl monostearate,
1.0 g. of isopropyl myristate,
1.0 g. of D & C Orange No. 5.

Formulation 2

3.0 g. of an organosilicon block copolymer consisting of 60 mol percent of a dimethylpolysiloxane block having an average of 39 silicon atoms per block and 40 mol percent of octadecylsiloxane units.
0.5 g. of a dimethylpolysiloxane fluid having a viscosity of 10 cs. at 25° C.,
0.1 g. of glyceryl monostearate,
1.0 g. of isopropyl myristate,
1.0 g. of D & C Red No. 20.

Formulation 3

3.0 g. of an organosilicon block copolymer consisting of 92 mol percent of dimethylpolysiloxane blocks having an average of 44 silicon atoms per block and 8 mol percent of blocks consisting of octadecylsiloxane units,
0.6 g. of glyceryl monostearate,
1.0 g. of D & C Red No. 12.

Formulation 4

3.0 g. of an organosilicon block copolymer consisting of 54 mol percent of dimethylpolysiloxane blocks having an average of 44 silicon atoms per block, 46 mol percent of blocks consisting of 21.75 mol percent of phenylsiloxane units and 78.25 mol percent of octadecylsiloxane units,
1.0 g. of dimethylpolysiloxane fluid having a viscosity of 10 cs. at 25° C.,
1.0 g. of a dimethylpolysiloxane fluid having a viscosity of 100 cs. at 25° C.,
0.5 g. of isopropyl myristate,
0.4 g. of cetyl alcohol,
1.0 g. of D & C Red No. 7.

Formulation 5

3.0 g. of an organosilicon block copolymer consisting of 75 mol percent of dimethylpolysiloxane blocks having an average of 44 silicon atoms per block and 25 mol percent of blocks consisting of octadecylsiloxane units,
0.5 g. of a dimethylpolysiloxane fluid having a viscosity of 10 cs. at 25° C.,
0.4 g. of cetyl alcohol,
1.0 g. of isopropyl myristate,
1.0 g. of D & C Red No. 27.

Formulation 6

3.0 g. of an organosilicon block copolymer consisting of 60 mol percent of dimethylpolysiloxane blocks having an average of 105 silicon atoms per block and 40 mol percent of blocks consisting of octadecylsiloxane units,
1.5 g. of dimethylpolysiloxane fluid having a viscosity of 10 cs. at 25° C.,
0.5 g. of isopropyl myristate,
0.4 g. of cetyl alcohol,
1.0 g. of D & C Red No. 12.

Formulation 7

3.0 g. of an organosilicon block copolymer consisting of 25 mol percent of dimethylpolysiloxane blocks having an average of 44 silicon atoms per block and 75 mol percent of blocks consisting of ocetadecylsiloxane units,
3.0 g. of a dimethylpolysiloxane fluid having a viscosity of 10 cs. at 25° C.,
1.5 g. of isopropyl myristate,
0.3 g. of cetyl alsohol,
1.0 g. of D & C Red No. 7.

Formulation 8

3.0 g. of an organosilicon block copolymer consisting of 10 mol percent of dimethylpolysiloxane blocks having an average of 44 silicon atoms per block and 90 mol percent of blocks consisting of octadecylsiloxane units,
2.5 g. of dimethylpolysiloxane fluid having a viscosity of 10 cs. at 25° C.
1.0 g. of dimethylpolysiloxane fluid having a viscosity of 100 cs. at 25° C.,
0.3 g. of cetyl alcohol,
2.0 g. of isopropyl myristate,
1.0 g. of D & C Red No. 12.

Formulation 9

3.0 g. of an organosilicon block copolymer consisting of 60 mol percent of dimethylpolysiloxane blocks having an average of 44 silicon atoms per block and 40 mol percent of blocks consisting of $C_{20}H_{41}SiO_{1.5}$,
1.5 g. of dimethylpolysiloxane fluid having a viscosity of 10 cs. at 25° C.,
0.3 g. of cetyl alcohol,
0.5 g. of isopropylmyristate,
0.8 g. of D & C Red No. 7.

EXAMPLE 4

A hydrocarbon-silicone copolymer was prepared by mixing 3 drops of a solution of 1 weight percent chloroplatinic acid in ethanol and 188.5 g. of an alpha-olefin mixture consisting of alkenes having 20 carbon atoms or more and alkanes having 20 carbon atoms or more where the alkenes represented about 70 weight percent of the alpha-olefin mixture. This mixture was heated to 110° C. in a 1 liter three neck flask equipped with a reflux condenser, thermometer and a mechanical stirrer. To the heated solution, 30.1 g. of a mixture of toluene and 20.5 g. of a dimethylpolysiloxane having two terminal silicon bonded hydrogen atoms and having an average of 8 silicon atoms per molecule was added dropwise. The addition required 0.5 hour. The mixture was then heated to 145° C. for 24 hours. The mixture was then stripped to 200° C. at 1.0 mm. Hg. The product was a waxy solid melting at 48° C. and had an average hydrocarbon radical of 61 carbon atoms per terminal silicon atom.

Lipsticks were prepared by the procedure of Example 1 from the above hydrocarbon-silicone copolymer which was very creamy, smooth, had no drag and marked even and well. The formulations were:

(A)

3.0 g. of the above hydrocarbon-silicone copolymer,
1.0 g. of a dimethylpolysiloxane fluid having a viscosity of 10 cs. at 25° C.,
0.5 g. of isopropyl myristate,
0.5 g. of cetyl alcohol,
1.0 g. of color (B)

3.00 g. of the above hydrocarbon-silicone copolymer,
1.78 g. of dimethylpolysiloxane fluid having a viscosity of 10 cs. at 25° C.,
1.10 g. of isopropyl myristate,
0.71 g. of cetyl alcohol,
0.99 g. of color.

EXAMPLE 5

A hydrocarbon-silicone copolymer was prepared by melting 124.6 g. of an alpha-olefin mixture consisting of alkenes having 20 carbon atoms or more and alkanes having 20 carbon atoms or more where the alkenes represented about 70 weight percent of the alpha-olefin mixture. Three drops of a solution of 1 weight percent chloroplatinic acid in ethanol were added. The mixture was heated to 110° C. To the heated mixture 50.2 g. of the dimethylpolysiloxane mixture of Example 4 was added dropwise at a rate sufficient to maintain the temperature of the mixture at 110° C. The mixture was then heated to 144° C. for 24 hours with stirring. The mixture was then stripped to 210° C. at 1.0 mm. Hg. The product was a waxy solid at room temperature with a melting point of 54° C. and had an average hydrocarbon radical of 40 carbon atoms per terminal silicon atom.

A lipstick having the following formulation was prepared by the procedure of Example 1:

3.0 g. of the above hydrocarbon-silicone copolymer,
1.0 g. of a dimethylpolysiloxane fluid having a viscosity of 10 cs. at 25° C.,
0.5 g. of cetyl alcohol,
1.0 g. of color.

The above lipstick was excellent, very smooth, and even marking.

EXAMPLE 6

A hydrocarbon-silicone copolymer was prepared by mixing 3 drops of a solution of 1 weight percent chloroplatinic acid in ethanol and 188.5 g. of an alpha-olefin mixture consisting of alkenes and alkanes both having 20 or more carbon atoms per molecule where the alkenes represented about 70 weight percent of the alpha-olefin mixture. This mixture was heated to 110° C. and then tetramethyldihydrogendisoloxane was added at a sufficient rate to maintain the temperature at 110° C. After the addition the mixture was heated at 150° C. for 2 hours. The resulting mixture was then stripped to 180° C. at 1.0 mm. Hg. The product was a waxy solid at room temperature and melted at 55° C. and had an average hydrocarbon radical of 61 carbon atoms per silicon atom.

A lipstick prepared by the procedure of Example 1 from the above hydrocarbon-silicone copolymer was creamy, even marking and smooth and had the following formulation:

3.0 g. of the above hydrocarbon-silicone copolymer,
1.5 g. of a dimethylpolysiloxane fluid having a viscosity of 10 cs. at 25° C.,
0.4 g. of cetyl alcohol,
0.75 g. of isopropyl myristate,
1.0 g. of color.

EXAMPLE 7

A lipstick was prepared by the procedure of Example 1, the following formulation was used:

| Ingredient: | Weight percent |
|---|---|
| Microcrystalline wax commercially known as Be square 190/195 Amber | 20 |
| Silicone polymer of repeating units of the formula $(C_{16}H_{33})CH_3SiO$ having a melting point of 30° C. | 20 |
| Cetyl alcohol | 5 |
| Lanolin | 5 |
| Pale paraffin oil | 25 |
| Glyceryl monostearate | 5 |
| Color and pigments | 20 |

The lipstick marked evenly and well.

EXAMPLE 8

A silicone-carnauba wax copolymer was prepared by melting 100 g. of carnauba wax, adding 20 drops of $BF_3 \cdot CH_3CH_2OCH_2CH_3$ and then 20 g. of

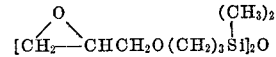

The mixture was heated and stirred at 80° to 100° C. for 30 minutes and then cooled. A tough, smooth wax melting at 82° C. was obtained.

A lipstick prepared by the procedure of Example 1 and having the following formula marked even:

3.0 g. of the above silicone-carnauba wax copolymer,
3.0 g. of a phenylmethylpolysiloxane fluid having a viscosity of 50 cs. at 25° C.,
0.5 g. of glyceryl monostearate,
1.0 g. of color.

EXAMPLE 9

A chapstick was prepared by the procedure of Example 1 for the preparation of a lipstick. The chapstick retained its spreadability at temperatures well below room temperature.

The formulation was:

3.0 g. of an organosilicon block copolymer consisting of 60 mol percent of dimethylpolysiloxane blocks having an average of 44 silicon atoms per block and 40 mol percent of blocks consisting of octadecylsiloxane units,
1.0 g. of a dimethylpolysiloxane fluid having a viscosity of 100 cs. at 25° C.
4.5 g. of a phenylmethylpolysiloxane fluid having a viscosity of 50 cs. at 25° C.
1.0 g. of a partial hydrolyzate of distearoxy dimethylsilane,
1.0 g. of isopropyl myristate,
1.5 g. of lanolin,
0.3 g. of cetyl alcohol.

EXAMPLE 10

An excellent lipstick was prepared by the procedure of Example 1. The lipstick remained unchanged at 160° F. and was creamy, smooth and marked well. The formulation was:

2.0 g. of 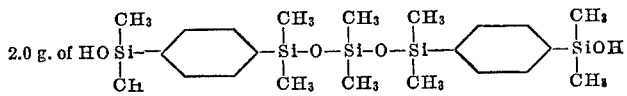

2.0 g. of a microcrystalline wax,
2.0 g. of a phenylmethylpolysiloxane fluid having a viscosity of 50 cs. at 25° C.,
1.0 g. of isopropyl myristate,
1.0 g. of color.

(A)
(B)
(C)
(D)
(E)
(F)
(G)
(H)

EXAMPLE 11

A liquid lip coloring composition is prepared when the following ingredients are thoroughly mixed as in Example 1. The parts are parts by weight.

5 parts of an organosilicon block copolymer consisting of 65 mol percent of dimethylpolysiloxane blocks having an average of 6 silicon atoms per block and 35 mol percent of blocks consisting of $C_{24}H_4SiO_{1.5}$,
40 parts of a dimethylpolysiloxane having a viscosity of 350 cs. at 25° C.,
20 parts of isopropyl myristate,
10 parts of cetyl alcohol,
25 parts of coloring agent.

EXAMPLE 12

A lipstick is prepared when the following ingredients are compounded and molded by the procedure of Example 1. The parts are parts by weight.

70 parts of an organosilicon block copolymer consisting of 50 mol percent of dimethylpolysiloxane blocks having an average of 150 silicon atoms per block and 50 mol percent of blocks consisting of $C_{26}H_{53}SiO_{1.5}$,
10 parts of isopropyl myristate,
20 parts of coloring agent.

EXAMPLE 13

A lipstick is prepared when the following ingredients are compounded and molded by the procedure of Example 1. The parts are parts by weight.

30 parts of the organosilicon block copolymer of Example 3, Formulation 2,
20 parts of beeswax,
5 parts of liquid paraffin,
4 parts of stearyl alcohol,
8 parts of butyl stearate,
10 parts of the ester of tetrahydrofurfuryl alcohol and stearic acid,
5 parts of cocoa butter,
12 parts of isopropyl myristate,
5 parts of coloring agent,
1 part of linalyl cinnamate.

EXAMPLE 14

When any of the following silicone copolymers replace the hydocarbon-silicone in the lipstick formulation of Example 5, an equivalent lipstick is obtained.

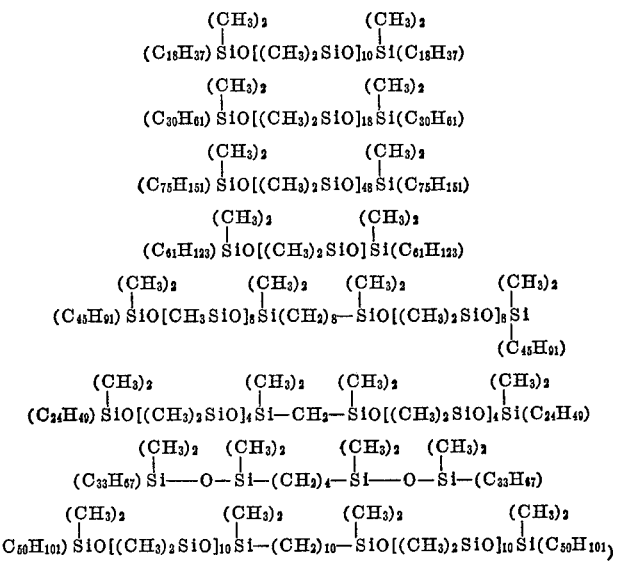

EXAMPLE 15

When any of the following silicone-carnauba wax copolymers replace the silicone-carnauba wax copolymer of Example 1 in the lipstick formulations, equivalent lipsticks are obtained.

(A) A copolymer made by reacting 40 weight percent carnauba wax and 60 weight percent

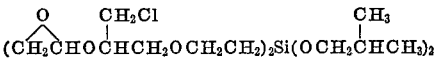

(B) A copolymer made by reacting 95 mol percent of a carnauba wax which is 5 percent hydrolyzed and 5 weight percent of

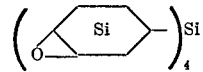

(C) A copolymer made by reacting 50 weight percent carnauba wax and 50 weight percent of a copolymer consisting of 5 mol percent

units and the remainder being $(CH_3)_2SiO$ and

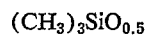

units.

(D) A copolymer made by reacting 45 weight percent carnauba wax and 55 weight percent of a

polymer.

(E) A copolymer made by reacting 60 weight percent carnauba wax which is 70 percent hydrolyzed and 40 weight percent

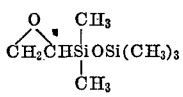

(F) A copolymer made by reacting 70 weight percent carnauba wax with 30 weight percent of any one of the following epoxy containing organosilicon compounds (1)   $(CH_3)_2$ $(CH_3)_2$ $\quad$ O
$\quad$ HSi—O—SiCH$_2$CH$_2$CH$_2$O CH$_2$CHCH$_2$ (2)   O $\quad\quad\quad\quad\quad$ CH$_3$
$\quad$ [CH$_2$CHCH$_2$O CH$_2$CH$_2$CH$_2$Si]$_2$O
$\quad\quad\quad\quad\quad\quad\quad\quad\quad\quad\quad$ CH$_3$ (3)   $\quad\quad$ O $\quad\quad\quad\quad\quad$ CH$_3$
$\quad$ [(CH$_3$)$_2$C——CHCH$_2$CH$_2$SiO] polymer (4)   $\quad\quad\quad\quad\quad\quad$ CH$_2$CH$_2$
$\quad\quad\quad$ —CH$_2$CH$_2$Si(OCH$_3$)$_2$ (5)   $\quad$ O $\quad\quad\quad\quad\quad\quad\quad$ CH$_3$
$\quad$ CH$_2$—CH—⟨⟩—SiO polymer (6)   CH$_3$ $\quad\quad\quad\quad$ OCH$_2$CHCH$_2$ $\quad$ O
$\quad$ (CH$_3$CH$_2$O)$_2$SiCH$_2$CH$_2$CH$_2$O CH$_2$CHCH$_2$O CH$_2$CHCH$_2$ (7)   $\quad\quad$ O $\quad\quad\quad$ (C$_6$H$_5$)$_2$
$\quad\quad$ CH$_2$CHCH$_2$CH$_2$SiOH (8)   $\quad$ (CH$_3$)$_2$ $\quad\quad\quad$ O
$\quad$ Si[O SiCH$_2$CH$_2$CH$_2$O CH$_2$CHCH$_2$]$_4$ (9)   $\quad\quad$ O $\quad\quad\quad$ (CH$_2$C$_6$H$_5$)$_2$
$\quad\quad$ CH$_2$CHCH$_2$CH$_2$Si(OCH$_3$)

(10)  O $\quad\quad\quad\quad\quad$ CH$_3$ CH$_3$ CH$_3$ $\quad\quad\quad\quad\quad$ O
$\quad$ CH$_2$CHCH$_2$O (CH$_2$)$_3$SiO[SiO]$_{60}$Si(CH$_2$)$_3$O CH$_2$CHCH$_2$
$\quad\quad\quad\quad\quad\quad\quad\quad\quad$ CH$_3$ CH$_3$ CH$_3$

EXAMPLE 16

When any of the following siloxane copolymers replace the siloxane copolymer of Example 7 an equivalent lipstick is obtained.

(A) A copolymer consisting of 1 mol percent of $(CH_3)_3SiO_{0.5}$ units, 45 mol percent $(CH_3)_2SiO$ units and 54 mol percent of $(C_{20}H_{41})(CH_3)SiO$ units.

(B) A copolymer consisting of 0.5 mol percent of $(CH_3)_3SiO_{0.5}$ units, 80 mol percent of $(CH_3)_2SiO$ units and 19.5 mol percent $(C_{26}H_{53})(CH_3)SiO$ units.

(C) A copolymer consisting of 2 mol percent of $(CH_3)_3SiO_{0.5}$ units, 5 mol percent $(CH_3)_2SiO$ units and 93 mol percent $(C_{22}H_{45})(CH_3)SiO$ units.

(D) A copolymer consisting of 2 mole percent of $(CH_3)_3SiO_{0.5}$ units, 10 mol percent

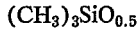

units where $e$ is 1.98 and 88 mol percent of $(C_{18}H_{57})(CH_3)SiO$ units.

EXAMPLE 17

When any of the following silphenylene copolymers replace the silphenylene copolymer of Example 10, an equivalent lipstick is obtained.

(A) 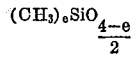

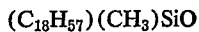

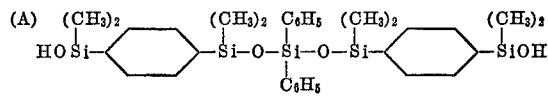

(B) 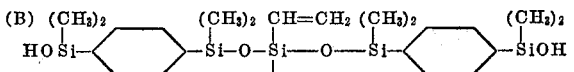

(C) 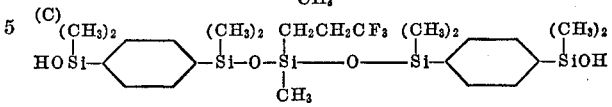

(D) A copolymer of 45 mol percent

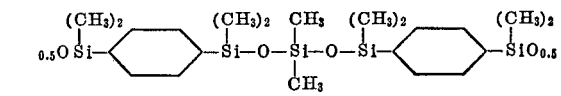

and 55 mol percent of $C_{18}H_{37}SiO_{1.5}$ (E) A copolymer of 5 mol percent

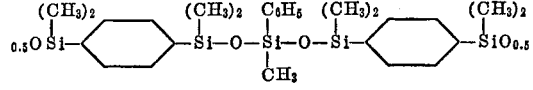

and 95 mol percent $C_{22}H_{45}SiO_{1.5}$ (F) A copolymer of 95 mol percent

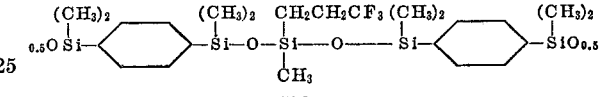

and 5 mol percent $C_{16}H_{33}SiO_{1.5}$ (G) A copolymer of 60 mol percent of

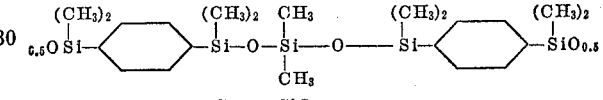

and 5 mol percent $C_{16}H_{33}SiO_{1.5}$

EXAMPLE 18

Lip coloring compositions are obtained when the following ingredients are thoroughly mixed. Parts are parts by weight.

(A)

30 parts of the silphenylene copolymer of Example 10
2 parts of the diethylpolysiloxane fluid having a viscosity of 500 cs. at 25° C.
30 parts isopropyl myristate
5 parts lanolin
5 parts cetyl alcohol
13 parts glyceryl monostearate
15 parts coloring agent.

(B)

70 parts of the silicone-carnauba wax copolymer of Example 8
5 parts of methylpropylpolysiloxane fluid having a viscosity of 5 cs. at 25° C.
2 parts cetyl alcohol
23 parts coloring agent.

(C)

20 parts of the hydrocarbon-silicone copolymer of Example 5
30 parts of a dimethylpolysiloxane fluid having a viscosity of 20 cs. at 25° C.
20 parts of a diethylpolysiloxane fluid having a viscosity of 80 cs. at 25° C.
15 parts isopropyl myristate
10 parts of D & C Red No. 25.

(D)

40 parts of the organosilicon block copolymer of Example 3, Formulation 9
2 parts of a phenylmethylpolysiloxane fluid having a viscosity of 200 cs. at 25° C.
30 parts propylene glycol monostearate
10 parts lanolin
10 parts lecithin
8 parts of D & C Orange No. 13.

EXAMPLE 19

Lip coloring compositions are obtained when the following ingredients are thoroughly mixed. Parts are parts by weight.

(A)

10 parts of the silicone copolymer of Example 7,
30 parts of ceresine,
5 parts of cetyl alcohol,
10 parts of diethylsebacate,
11 parts N,N-dimethylacetamide,
12 parts isopropyl myristate,
20 parts of color,
2 parts of flavor.

(B)

7.5 parts of the organosilicon block copolymer of Example 3, Formulation 6,
2.5 parts of carnauba wax,
40.0 parts of beeswax,
8.0 parts of dimethylpolysiloxane fluid having a viscosity of 50 cs. at 25° C.,
2.0 parts of ethyl ricinoleate acetate,
10.0 parts of ethyl stearate,
10.0 parts of cocoa butter,
10.0 parts of color,
10.0 parts of titanium dioxide.

(C)

35 parts of the silicone-carnauba wax copolymer of Example 2,
5 parts of beeswax,
20 parts of isopropyl myristate,
10 parts of lanolin,
5 parts cetyl alcohol,
25 parts color.

That which is claimed is:

1. A cosmetic composition having a wax base comprising from 7 to 70 weight percent cosmetic solvent, from 2 to 25 weight percent coloring agent and from 2 to 70 weight percent organic wax of which at least 15 weight percent is silicone wax and the remaining organic wax is wax selected from the group consisting of beeswax, paraffin wax, carnauba wax, ceresine, cocoa butter, ozokerite, candelilla, spermaceti, hydrogenated vegetable oil, montan, microcrystalline wax and lanolin alcohol, said silicone wax being selected from the group consisting of (A) an organosilicon block copolymer consisting of
  (1) 5 to 95 mol percent of blocks of polysiloxane of the structure $$[(CH_3)_2SiO]_x[(C_6H_5)(CH_3SiO]_y[(CH_3)SiO_{1.5}]_z$$

in which the sum of $x+y+z$ has an average value of from 6 to 150, and $y$ and $z$ each have a value of up to 5 mol percent of the sum of $x+y+z$, and (2) 6 to 95 mol percent of blocks of the average unit formula

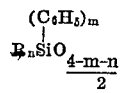

in which R is an alkyl radical containing from 16 to 26 carbon atoms, $m$ has a value of up to 0.25, $n$ has a value of from 0.75 to 1.05 and the sum of $m+n$ has a value of from 0.95 to 1.05, (B) a hydrocarbon-silicone copolymer consisting essentially of a copolymer selected from the group consisting of a copolymer having an average formula

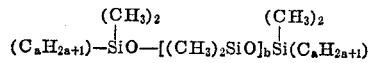

in which $a$ has an average value from 18 to 75 inclusive, $b$ has an average value from 0 to 48 inclusive, and there being at least 3 carbon atoms based on the total number of carbon atoms in the $C_aH_{2a+1}$ radical per silicon atom based on the total number of silicon atoms per molecule, and a copolymer having an average formula

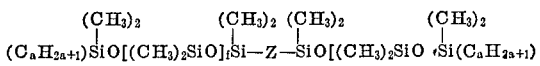

in which $a$ is defined above.,
  $f$ has an average value from 0 to 10 inclusive, and
  Z is a divalent hydrocarbon radical selected from the group consisting of methylene, ethylene, propylene, butylene, pentylene, hexylene, heptylene, octylene, nonylene and decylene, (C) a silicone-carnauba wax copolymer consisting essentially of a silicon-containing moiety bonded to a carnauba wax moiety at least 60 percent being through a (silicone)-$CY_k$—O—$CH_2$— (carnauba wax) linkage in which (silicone-$CY_k$— is a silicon-containing moiety selected from the group consisting of

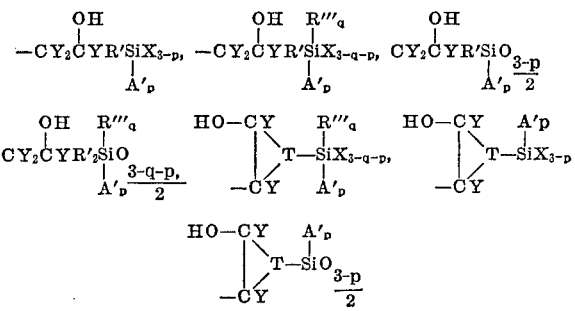

mixtures thereof, copolymers thereof, and copolymers consisting essentially of from 0.001 to 99.999 mol percent units of a formula selected from the group consisting of

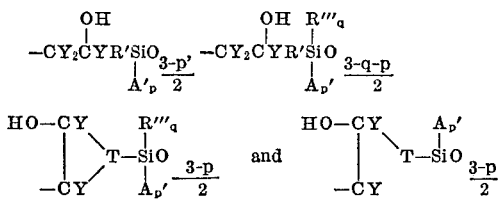

and 0.001 to 99.999 mol percent units of the formula selected from the group consisting of $SiO_{4/2}$, $R'''SiO_{1.5}$, $R'''_2SiO$ and $R'''_3SiO_{0.5}$, in which $k$ is an integer from 1 to 2 inclusive, Y is a monovalent radical selected from the group consisting of hydrocarbon radicals having from 1 to 18 carbon atoms inclusive, halogenated hydrocarbon radicals having from 1 to 12 carbon atoms inclusive wherein the halogen is chlorine, fluorine or bromine, hydroxylated hydrocarbon radicals having from 3 to 6 carbon atoms inclusive, and hydrogen atoms, R' is a divalent radical having from 1 to 36 carbon atoms selected from the group consisting of hydrocarbon radicals, hydroxylated hydrocarbon radicals, halogenated hydrocarbon radicals wherein the halogen is chlorine, fluorine or bromine and —$(R^4OR^4)_w$— radicals in which $R^4$ is the same as R' and $w$ is an integer of at least 1, X is a monovalent radical selected from the group consisting of hydroxyl radicals, hydrocarbonoxy radicals having from 1 to 12 inclusive carbon atoms and halogenated hydrocarbonoxy radicals having from 2 to 7 carbon atoms inclusive wherein the halogen is chlorine, fluorine or bromine. R''' is a monovalent radical selected from halogen is chlorine, fluorine or bromine carbon atoms inclusive, $R'''$ is a monovalent radical selected from the group consisting of hydrogen atoms, hydrocarbon radicals having from 1 to 18 carbon atoms inclusive and halogenated hydrocarbon radicals having from 1 to 12 carbon atoms inclusive wherein the halogen is chlorine, fluorine or bromine, T is a trivalent radical having from 1 to 31 carbon atoms inclusive selected from the group consisting of hydrocarbon radicals, hydroxylated hydrocarbon radicals, halogenated hydrocarbon radicals wherein the halogen is chlorine, fluorine or bromine and $TOR^4$ radicals in which T and $R^4$ are defined above, A' is a divalent radical selected from the group consisting of radicals and

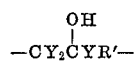

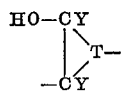

radicals which is bonded to the carnauba wax moiety through an oxygen atom in turn attached to the carbon atom which is attached to a Y radical, $p$ is an integer from 0 to 3 inclusive, $q$ is an integer from 0 to 3 inclusive, said carnauba wax moiety being bonded to the silicon-containing moiety through an oxygen atom which in the unreacted state is contained by a hydroxyl radical of the carnauba wax, and said carnauba wax moiety being present in an amount of from 40 to 95 inclusive weight percent based on the combined weight of the silicon-containing moiety and the carnauba wax moiety, (D) a silioxane copolymer consisting esesntially of
  (3) siloxane units of the formula $(CH_3)_3SiO_{0.5}$,
  (4) siloxane units of the formula

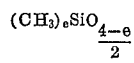

in which $e$ has an average value from 1.98 to 2.00 inclusive, and
  (5) siloxane units of the formula

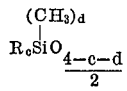

in which R is an alkyl radical having from 10 to 26 inclusive carbon atoms, $c$ has an average value from 0.95 to 1.05 inclusive, $d$ has an average value from 0.95 to 1.05 inclusive and the sum of $c+d$ has an average value from 1.98 to 2.00 inclusive, there being an average of up to 2.05 units of (3) per molecule and there being an average of at least one unit of (5) per 15 units of (4), and (E) a silphenylene copolymer selected from the group consisting of a copolymer of the formula

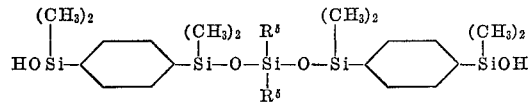

in which $R^5$ is selected from the group consisting of methyl, phenyl, vinyl and trifluoropropyl, and a copolymer consisting essentially of from 5 to 95 mol percent of units of

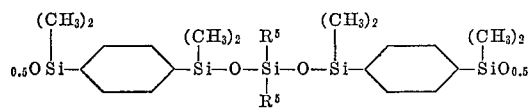

in which $R^5$ is defined above and from 5 to 95 mol percent of units of $RSiO_{1.5}$ in which R is defined above.

2. The cosmetic composition in accordance with claim 1 in which the silicone wax is (B).

3. The cosmetic composition in accordance with claim 1 in which the silicone wax is (D).

4. The cosmetic composition which is a lip coloring composition in accordance with claim 19 in which the cosmetic solvent is present in an amount of from 10 to 70 weight percent, the coloring agent is present in an amount of from 2 to 25 weight percent and the organic wax is present in an amount of from 2 to 70 weight percent.

5. The cosmetic composition which is a lip coloring composition in accordance with claim 4 in which the organic wax is present in an amount of from 20 to 60 weight percent.

6. The cosmetic composition which is a lip coloring composition in accordance with claim 4 in which the silicone wax is (B).

7. The cosmetic composition which is a lip coloring composition in accordance with claim 4 in which the silicone wax is (D).

8. The cosmetic composition which is a lip coloring composition in accordance with claim 1 in which the cosmetic solvent is present in an amount of from 2 to 50 weight percent, a diorganopolysiloxane fluid in which the organic radicals are selected from the group consisting of methyl, ethyl, propyl and phenyl is present in an amount of from 2 to 50 weight percent, the coloring agent is present in an amount of from 2 to 25 weight percent and the organic wax is present in an amount of from 2 to 70 weight percent.

9. The cosmetic composition which is a lip coloring composition in accordance with claim 8 in which the diorganopolysiloxane is present in an amount of from 8 to 40 weight percent and the diorganopolysiloxane is dimethylpolysiloxane fluid.

10. The cosmetic composition which is a lip coloring composition in accordance with claim 9 in which the organic wax is present in an amount of from 20 to 60 weight percent and the silicone wax is (D).

11. The cosmetic composition which is a lip coloring agent in accordance with claim 8 in which the diorganopolysiloxane fluid is present in an amount of from 2 to 40 percent, the cosmetic solvent is present in an amount of from 2 to 40 weight percent, the coloring agent is present in an amount of from 2 to 20 weight percent, at least 25 weight percent of the organic wax is silicone wax and cetyl alcohol is present in an amount of from 1 to 10 weight percent.

12. The cosmetic composition which is a lip coloring composition in accordance with claim 11 in which the diorganopolysiloxane fluid is dimethylpolysiloxane fluid and the organic wax is present in an amount of from 20 to 60 weight percent.

13. The cosmetic composition which is a lip coloring composition in accordance with claim 8 in which the diorganopolysiloxane is present in an amount of from 2 to 40 weight percent, the cosmetic solvent is present in an amount of from 2 to 40 weight percent, the coloring agent is present in an amount of from 2 to 20 weight percent, at least 25 weight percent of the organic wax is silicone wax and isopropyl myristate is present in an amount of from 2 to 25 weight percent.

14. The cosmetic composition which is a lip coloring composition in accordance with claim 13 in which the diorganopolysiloxane is dimethylpolysiloxane fluid, the organic wax is present in an amount of from 20 to 60 weight percent and the silicone wax is (D).

15. The cosmetic composition which is a lipstick in accordance with claim 1 in which the cosmetic solvent is present in an amount of from 1 to 25 weight percent, the coloring agent is present in an amount from 2 to 20 weight percent, the organic wax is silicone wax and is present in an amount of from 20 to 60 weight percent, and diorganopolysiloxane fluid in which the organic radicals are selected from the group consisting of methyl, ethyl, propyl and phenyl radicals is present in an amount of from 8 to 40 weight percent.

16. The cosmetic composition which is a lipstick in accordance with claim 15 in which the diorganopolysiloxane fluid is dimethylpolysiloxane fluid.

17. The cosmetic composition which is a lipstick in accordance with claim 15 in which the diorganopolysiloxane fluid is phenylmethylpolysiloxane fluid.

18. The cosmetic composition which is a lipstick in accordance with claim 15 in which the diorganopolysiloxane is dimethylpolysiloxane fluid and phenylmethylpolysiloxane fluid.

References Cited

UNITED STATES PATENTS

| | | | |
|---|---|---|---|
| 3,088,964 | 5/1963 | Ryan | 260—448.2 |
| 3,185,627 | 5/1965 | Kass | 424—184 |

ALBERT T. MEYERS, Primary Examiner

D. R. ORE, Assistant Examiner

U.S. Cl. X.R.

424—63, 184

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above—identified patent and that said Letters Patent is hereby corrected as shown below:

In Column 2, line 7; the line reading "require an addition ingredient to counteract the unde-" should read "require an additional ingredient to counteract the unde-"

In Column 2, line 63; the line reading "in which $a$ is defines above, $f$ has an average value from" should read "in which $a$ defined above, $f$ has an average value from"

In Column 6, line 38; the line reading "When there are less than 3 carbon atoms per silicon atoms," should read "When there are less than 3 carbon atoms per silicon atom,"

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above-identified patent and that said Letters Patent are hereby corrected as shown below:

In Column 6, line 75; the formula reading should read

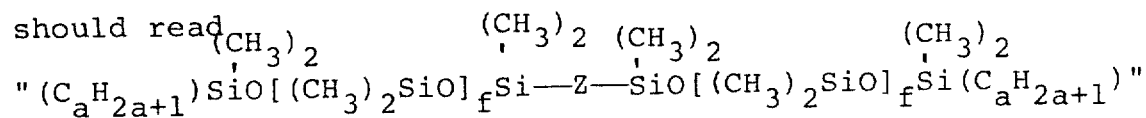

In Column 7, line 62; the line reading "The silicon carnauba wax copolymers (C) consist" should read "The silicone-carnauba wax copolymers (C) consist"

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above-identified patent and that said Letters Patent are hereby corrected as shown below:

In Column 8, line 11; the formula reading

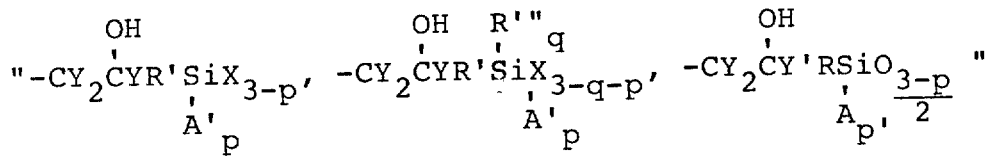

should read

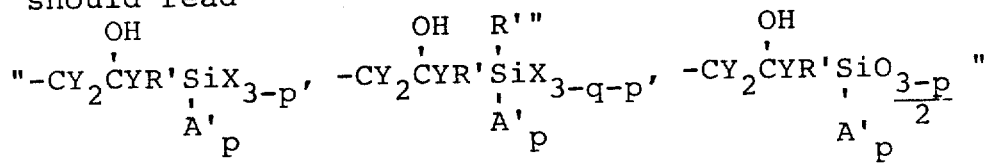

In Column 8, line 30; the formula reading

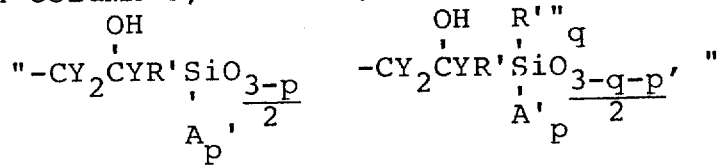

should read

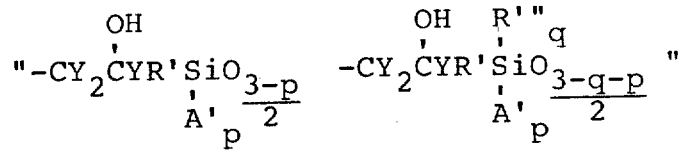

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above-identified patent and that said Letters Patent are hereby corrected as shown below:

In Column 9, line 26; the formula reading

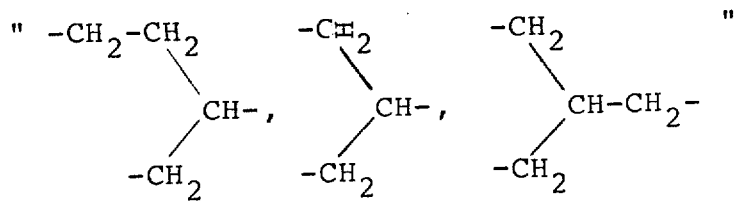

should read 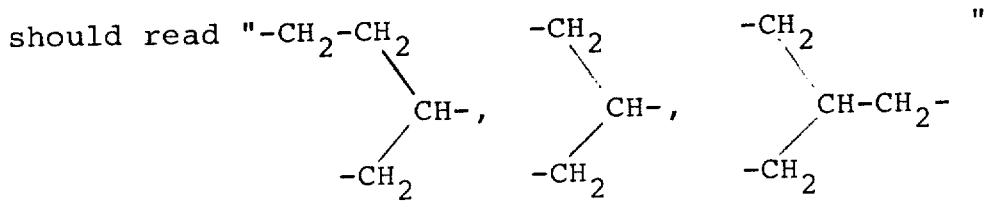

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above-identified patent and that said Letters Patent are hereby corrected as shown below:

In Column 13, line 30; the formula reading should read 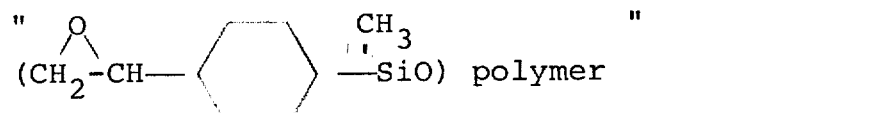

In Column 13, line 40; the formula reading

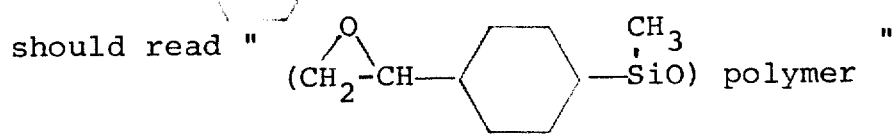

UNITED STATES PATENT AND TRADEMARK OFFICE
CERTIFICATE OF CORRECTION

PATENT NO. : 3,641,239  
DATED : February 8, 1972  
INVENTOR(S) : Sharon R. Mohrlok Page 6 of 17

It is certified that error appears in the above-identified patent and that said Letters Patent are hereby corrected as shown below:

In Column 13, line 49; the formula reading should read

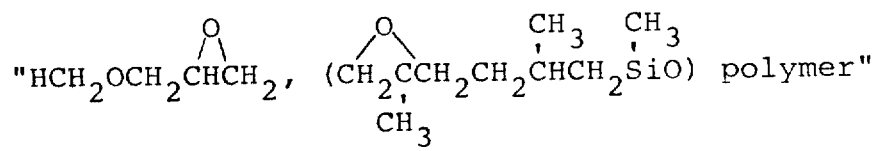

In Column 13, line 62; the formula reading

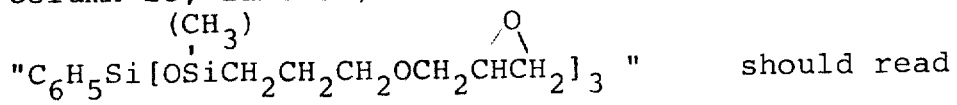     should read

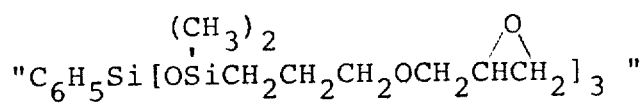

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 13, line 67; the formula reading should read

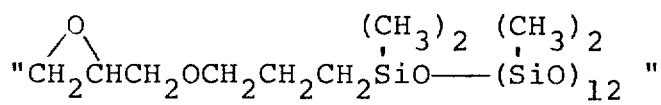

In Column 13, line 74; the formula reading

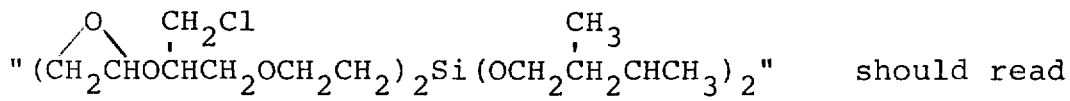

should read

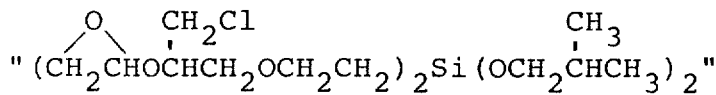

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 14, line 56; the formula reading " $\begin{array}{ccc} R'" & R'" & R'"_2 \\ | & | & | \\ \end{array}$ "
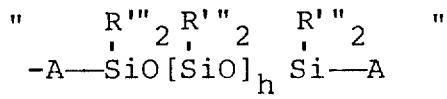
should read " $\begin{array}{ccc} R'"_2 & R'"_2 & R'"_2 \\ | & | & | \\ \end{array}$ "
$-A-SiO[SiO]_h Si-A$ In Column 15, line 70; the line reading "Tht silphenylene copolymer of the second type can be" should read "The silphenylene copolymer of the second type can be"

In Column 17, line 35; the line reading "the disodium salt of 9-ortho-carboxyphenyl-6-hydroxy-" should read "the disodium salt of 9-ortho-carboxyphenyl-6-hydroxyl-"

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above—identified patent and that said Letters Patent is hereby corrected as shown below:

In Column 18, line 3; the line reading "in that can be formulated into excellent cosmetics with-" should read "in that they can be formulated into excellent cosmetics with-"

In Column 18, line 30; the line reading "lower melting point that the melting point of the wax" should read "lower melting point than the melting point of the wax"

In Column 20, line 44; the line reading "percent of blocks consisting of ocetadecylsiloxane units," should read "percent of blocks consisting of octadecylsiloxane units,"

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above—identified patent and that said Letters Patent is hereby corrected as shown below:

In Column 20, line 48; the line reading "0.3 g. of cetyl alsohol," should read "0.3 g. of cetyl alcohol,"

In Column 22, line 1; the line reading "tetramethylidihydrogendisoloxane was added at a sufficient" should read "tetramethyldihydrogendisiloxane was added at a sufficient"

In Column 23, line 6; the formula reading

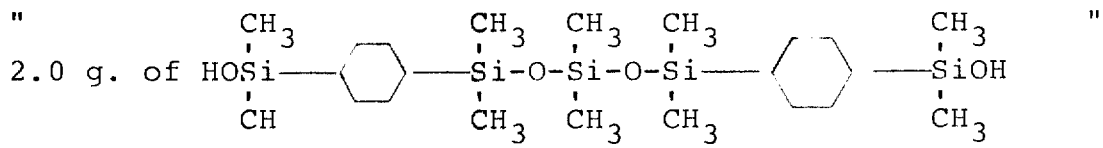

should read

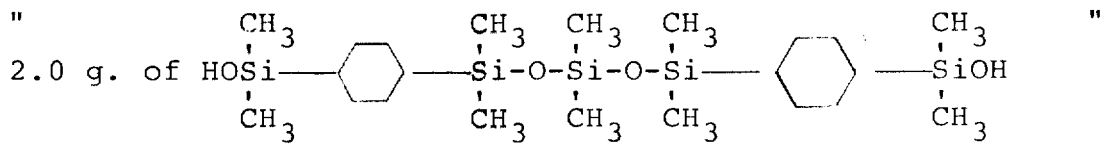

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above—identified patent and that said Letters Patent is hereby corrected as shown below:

In Column 23, line 47; the line reading "cent of blocks consisting of $C_{24}H_4SiO_{1.5}$," should read "cent of blocks consisting of $C_{24}H_{49}SiO_{1.5}$,"

In Column 24, line 53; the formula reading " 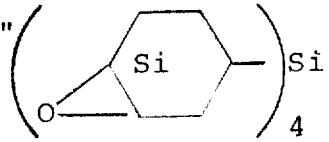 "

should read " 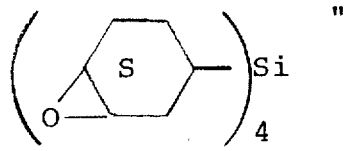 "

UNITED STATES PATENT AND TRADEMARK OFFICE
CERTIFICATE OF CORRECTION

PATENT NO. : 3,641,239
DATED : February 8, 1972
INVENTOR(S) : Sharon R. Mohrlok

It is certified that error appears in the above—identified patent and that said Letters Patent is hereby corrected as shown below:

In Column 25, line 23; the formula reading

"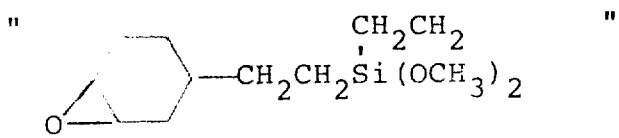"

should read "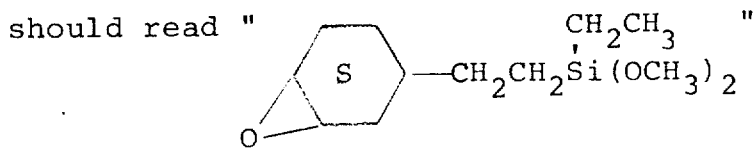"

In Column 26, line 33; the line reading "and 5 mol percent $C_{16}H_{33}SiO_{1.5}$" should read "and 40 mol percent of $C_{24}H_{49}SiO_{1.5}$"

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 27, line 48; the line reading "(A) an organosilicon block copolymer consisting" should read "(A) an organosilicon block copolymer consisting essentially"

In Column 27, line 53; the formula reading

"$[(CH_3)_2SiO]_x[(C_6H_5)(CH_3SiO]_y[(CH_3)SiO_{1.5}]_z$"

should read "$[(CH_3)_2SiO]_x[(C_6H_5)(CH_3)SiO]_y[(CH_3)SiO_{1.5}]_z$"

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 28, line 9; the formula reading

"

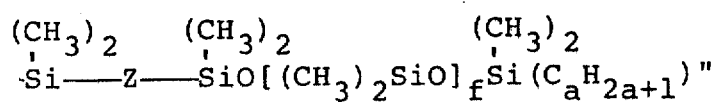 should read "$(C_aH_{2a+1})SiO[(CH_3)_2SiO]_f$-

$Si$——$Z$——$SiO[(CH_3)_2SiO]_fSi(C_aH_{2a+1})$"

In Column 28, line 30; the formula reading

" 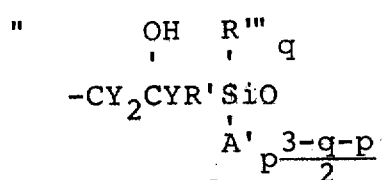 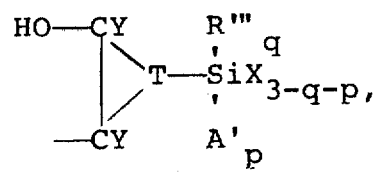 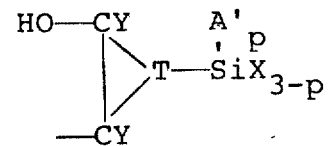 "

should read

" 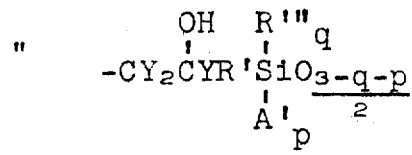 , 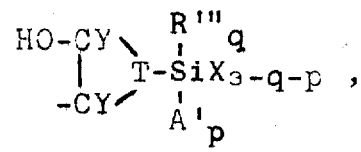 , 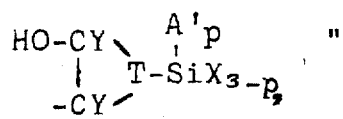 "

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 28, line 45; the formula reading

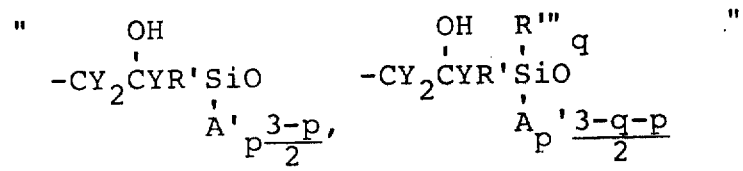

should read

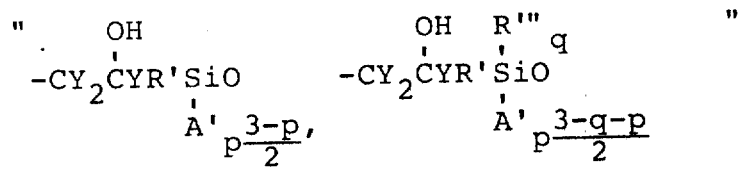

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 28, line 50; the formula reading

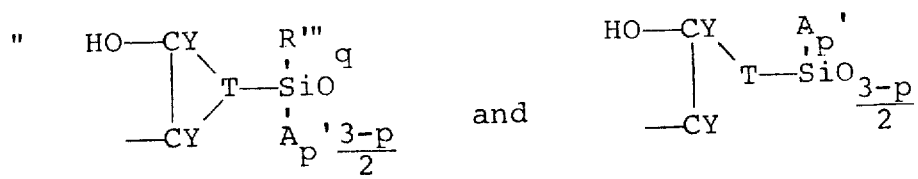

should read

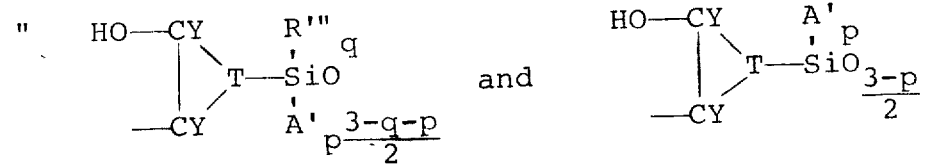

UNITED STATES PATENT AND TRADEMARK OFFICE
CERTIFICATE OF CORRECTION

PATENT NO. : 3,641,239

DATED : February 8, 1972

INVENTOR(S) : Sharon R. Mohrlok

It is certified that error appears in the above—identified patent and that said Letters Patent is hereby corrected as shown below:

In Column 28, line 75; the line reading "bromine. R'" is a monovalent radical selected from" should read "bromine." the rest of the line should be deleted.

In Column 29, line 1; the line reading "halogen is chlorine, fluorine or bromine carbon atoms" this line should be deleted.

In Column 29, line 2; the line reading "inclusive, R'" is a monovalent radical selected from" should read "R'" is a monovalent radical selected from"

Signed and Sealed this

Eighth Day of June 1982

[SEAL]

Attest:

Attesting Officer

GERALD J. MOSSINGHOFF

Commissioner of Patents and Trademarks